(12) United States Patent
Matsuoka

(10) Patent No.: US 10,006,195 B2
(45) Date of Patent: Jun. 26, 2018

(54) VARIABLE AREA FRAME AND VARIABLE VOLUME THREE-DIMENSIONAL STRUCTURE USING EXTENDABLE ARM

(71) Applicant: FUJIMIYASEISAKUSHO CO., LTD., Kumamoto (JP)

(72) Inventor: Norimichi Matsuoka, Kumamoto (JP)

(73) Assignee: FUJIMIY ASEISAKUSHO CO., LTD., Kumamoto (JP)

(*) Notice: Subject to any disclaimer, the term of this patent is extended or adjusted under 35 U.S.C. 154(b) by 142 days.

(21) Appl. No.: 14/984,204

(22) Filed: Dec. 30, 2015

(65) Prior Publication Data

US 2016/0319985 A1    Nov. 3, 2016

(30) Foreign Application Priority Data

Apr. 30, 2015  (JP) ................. 2015-093299

(51) Int. Cl.
| | |
|---|---|
| *E04B 1/344* | (2006.01) |
| *E04H 15/50* | (2006.01) |
| *A63H 33/00* | (2006.01) |
| *A63H 33/04* | (2006.01) |
| *F16M 11/38* | (2006.01) |
| *A01K 1/03* | (2006.01) |

(Continued)

(52) U.S. Cl.
CPC .............. *E04B 1/3441* (2013.01); *A01K 1/03* (2013.01); *A63H 33/00* (2013.01); *A63H 33/042* (2013.01); *E04H 15/50* (2013.01); *F16M 11/38* (2013.01); *E04H 1/1244* (2013.01); *E04H 15/006* (2013.01); *F21V 33/0028* (2013.01); *F21Y 2115/10* (2016.08)

(58) Field of Classification Search
CPC ....... E04B 1/3441; E04H 15/50; E04H 15/52; F16M 11/38; A63F 9/088; F24J 2002/5277; A45B 19/12; A47H 5/04
USPC ............................ 52/109, 645, 646; 135/145
See application file for complete search history.

(56) References Cited

U.S. PATENT DOCUMENTS

| | | | | |
|---|---|---|---|---|
| 23,503 | A * | 4/1859 | Seldon ................ | A45B 19/12 135/25.2 |
| 250,205 | A * | 11/1881 | Collins ................ | B65D 7/26 220/6 |

(Continued)

FOREIGN PATENT DOCUMENTS

| | | | | |
|---|---|---|---|---|
| CN | 102172840 A | | 9/2011 | |
| EP | 3088065 A1 * | | 11/2016 | ............. A63H 33/00 |

(Continued)

OTHER PUBLICATIONS

Extended European Search Report for corresponding Application No. 16151737.0, dated Sep. 19, 2016.

*Primary Examiner* — Robert Canfield
(74) *Attorney, Agent, or Firm* — Hauptman Ham, LLP

(57) ABSTRACT

A variable area frame includes: extendable arms forming each side of a polygonal frame; and a coupling mechanism that couples adjoining two of the extendable arms so that these two extendable arms can move together, in order to allow adjoining two sides of the polygonal frame to extend and contract together. Each extendable arm includes a plurality of cross units each formed by pivotally coupling two rigid members, which cross each other to form an X-shape, via a middle coupling shaft, and an end coupling portion that pivotally couples ends of adjoining ones of the cross units.

14 Claims, 32 Drawing Sheets

(51) Int. Cl.
*E04H 15/00* (2006.01)
*E04H 1/12* (2006.01)
*F21V 33/00* (2006.01)
*F21Y 115/10* (2016.01)

(56) References Cited

U.S. PATENT DOCUMENTS

| | | | | |
|---|---|---|---|---|
| 927,738 | A | * | 7/1909 | Malaby ............ E04H 15/50 135/145 |
| 1,330,901 | A | * | 2/1920 | Richards ........... A47C 19/126 5/115 |
| 1,335,230 | A | * | 3/1920 | Gleeson ............ A47C 29/006 135/145 |
| 1,444,487 | A | * | 2/1923 | Volters ............. A47K 3/06 220/9.3 |
| 2,697,845 | A | * | 12/1954 | Broner ............. E01D 15/124 14/45 |
| 3,557,500 | A | * | 1/1971 | Schmidt et al. ..... E04B 1/3441 52/109 |
| 4,601,301 | A | * | 7/1986 | Hermanson ......... A45B 19/06 135/145 |
| 4,942,700 | A | * | 7/1990 | Hoberman .......... E04B 1/3211 52/109 |
| 5,024,031 | A | * | 6/1991 | Hoberman .......... E04B 1/3211 52/109 |
| 5,038,532 | A | * | 8/1991 | Shahinpoor ........ E04B 1/3441 52/109 |
| 5,125,205 | A | * | 6/1992 | Wichman ........... A47F 5/13 40/610 |
| 5,761,871 | A | * | 6/1998 | Atake .............. E04B 1/32 52/109 |
| 6,112,757 | A | * | 9/2000 | Tseng .............. E04H 15/50 135/131 |
| 6,283,314 | B1 | * | 9/2001 | Loguercio .......... D06F 57/06 211/200 |
| 6,834,465 | B2 | * | 12/2004 | Hoberman .......... E04B 1/3441 52/3 |
| 6,918,312 | B2 | * | 7/2005 | Elwood ............ G01K 15/00 374/E15.001 |
| 6,981,350 | B1 | * | 1/2006 | Redmon ............ G09F 15/0062 359/443 |
| 7,100,333 | B2 | * | 9/2006 | Hoberman .......... E04B 1/3211 135/29 |
| 7,377,231 | B2 | * | 5/2008 | Tsai ............... E04H 15/50 119/474 |
| 7,604,212 | B2 | * | 10/2009 | Tsai ............... E04H 15/50 119/474 |
| 9,153,860 | B2 | * | 10/2015 | Tserodze ........... F24J 2/523 |
| 9,334,643 | B2 | * | 5/2016 | Betts .............. A01K 1/00 |
| 9,518,403 | B1 | * | 12/2016 | Tucker ............. E04H 15/58 |
| 2002/0083675 | A1 | * | 7/2002 | Hoberman .......... A63F 9/088 52/645 |
| 2002/0112413 | A1 | * | 8/2002 | Hoberman .......... E04B 1/3211 52/71 |
| 2004/0144413 | A1 | | 7/2004 | Matthews et al. |
| 2005/0097832 | A1 | * | 5/2005 | Hoberman .......... E04B 1/3441 52/109 |
| 2005/0150046 | A1 | * | 7/2005 | Gehr ............... A47D 13/063 5/99.1 |
| 2007/0095375 | A1 | * | 5/2007 | Sample ............. E04H 1/1277 135/123 |
| 2009/0249546 | A1 | * | 10/2009 | Yul ................ A47C 17/72 5/115 |
| 2015/0060605 | A1 | * | 3/2015 | Tserodze ........... F24J 2/523 244/172.6 |
| 2015/0300560 | A1 | * | 10/2015 | Matsuoka .......... B25J 18/02 362/427 |
| 2018/0051458 | A1 | * | 2/2018 | Matsuoka .......... E04B 1/32 |

FOREIGN PATENT DOCUMENTS

| | | | | |
|---|---|---|---|---|
| FR | 446413 | A | * 12/1912 | ............ A47H 5/04 |
| GB | 191211348 | A | * 8/1912 | ............ A47H 5/04 |
| JP | S53-007912 | A | 1/1978 | |
| JP | S60-179598 | U | 11/1985 | |
| JP | H04-016651 | A | 1/1992 | |
| JP | 3102408 | U | 7/2004 | |
| JP | 2008-308940 | A | 12/2008 | |
| JP | 2014159070 | A | 9/2014 | |
| JP | 2016211617 | A | * 12/2016 | ............ A63H 33/00 |
| WO | 02/063111 | A1 | 8/2002 | |
| WO | WO-2007093871 | A1 | * 8/2007 | ............ E04H 15/50 |

* cited by examiner

VARIABLE AREA FRAME AND VARIABLE VOLUME THREE-DIMENSIONAL STRUCTURE USING EXTENDABLE ARM

BACKGROUND OF THE INVENTION

Field of the Invention

The present invention relates to variable area frames whose area can be changed according to an extending/contracting operation of an extendable arm and variable volume three-dimensional structures whose volume can be changed according to an extending/contracting operation of an extendable arm.

Background Art

The applicant of the present invention proposed in Japanese Unexamined Patent Application Publication No. 2014-159070 an extendable arm that extends and contracts in a curved path. This extendable arm is formed by a plurality of cross units connected in a linear fashion, and each cross unit is formed by two rigid members crossing each other to form an X-shape.

SUMMARY OF INVENTION

The inventors further studied if there is any way to make more effective use of the extendable arm and found that the areas of planar shapes or the volumes of three-dimensional shapes can be changed by using the extendable arm.

It is an object of the present invention to provide a variable area frame or a variable volume three-dimensional structure whose area or volume can be changed according to an extending/contracting operation of an extendable arm.

According to the present invention, a variable area frame as a polygonal frame whose area can be changed includes: extendable arms forming each side of the polygonal frame; and a coupling mechanism that couples adjoining two of the extendable arms so that the adjoining two extendable arms can move together, in order to allow adjoining two sides of the polygonal frame to extend and contract together. Each of the extendable arms includes a plurality of cross units each formed by pivotally coupling two rigid members, which cross each other to form an X-shape, via a middle coupling shaft, and an end coupling portion that pivotally couples ends of adjoining ones of the cross units.

In a preferred embodiment, the end coupling portion includes inner end coupling shafts located on an inner side of the polygonal frame and outer end coupling shafts located on an outer side of the polygonal frame. The coupling mechanism that allows adjoining two sides of the polygonal frame to extend and contract together includes a first bent member, a second bent member, and a corner coupling shaft which are placed at a corner of the polygonal frame. The first bent member pivotally couples the inner end coupling shaft of the extendable arm of one of the adjoining two sides of the polygonal frame and the outer end coupling shaft of the extendable arm of the other side. The second bent member pivotally couples the outer end coupling shaft of the extendable arm of the one of the adjoining two sides of the polygonal frame and the inner end coupling shaft of the extendable arm of the other side. The corner coupling shaft pivotally couples the first and second bent members at their intersection.

In the above preferred embodiment, it is desirable that the first and second bent members have a bend angle of A/n, where A represents a sum of interior angles of an n-gon.

In one embodiment, the polygonal frame is a quadrilateral frame. In this case, it is preferable that a value of L2/L1 be in a range of 1 to 1.5, where L1 represents an interval between the middle coupling shaft and the inner end coupling shaft and an interval between the middle coupling shaft and the outer end coupling shaft in each of the rigid members, and L2 represents an interval between the corner coupling shaft and the inner end coupling shaft and an interval between the corner coupling shaft and the outer end coupling shaft in each of the bent members.

In another embodiment, the end coupling portion includes inner end coupling shafts located on an inner side of the polygonal frame and outer end coupling shafts located on an outer side of the polygonal frame. The coupling mechanism that allows adjoining two sides of the polygonal frame to extend and contract together includes at a corner of the polygonal frame an inner end coupling member that pivotally couples an inner end of the extendable arm of one of the adjoining two sides of the polygonal frame and an inner end of the extendable arm of the other side. In this embodiment, the coupling mechanism may further include at the corner of the polygonal frame an outer end coupling member that pivotally couples an outer end of the extendable arm of one of the adjoining two sides of the polygonal frame and an outer end of the extendable arm of the other side.

In the case where the variable area frame has a quadrilateral shape, in one embodiment, the coupling mechanism includes the first bent member, the second bent member, and the corner coupling shaft at each of two diagonally opposite ones of four corners of the quadrilateral frame, and includes at each of the remaining two diagonally opposite corners of the quadrilateral frame an inner end coupling member that pivotally couples an inner end of the extendable arm of one of the adjoining two sides of the quadrilateral frame and an inner end of the extendable arm of the other side.

A variable volume three-dimensional structure according to the present invention includes: a longitudinal coupling member that couples two of the variable area frames according to any one of the above aspects such that the two variable area frames are separated from and parallel to each other.

In one embodiment, the longitudinal coupling member is a bar having a fixed longitudinal length.

In another embodiment, the longitudinal coupling member has a variable longitudinal length.

In a preferred embodiment, the longitudinal coupling member having the variable longitudinal length is a longitudinal extendable arm including a cross unit formed by two rigid members that cross each other to form an X-shape. The longitudinal extendable arm may be formed by a single cross unit or may be formed by a plurality of cross units connected in a longitudinal direction.

In one embodiment, an upper end of the longitudinal extendable arm is coupled to the end coupling portion of the extendable arm of one of the two variable area frames, or an upper one of the two variable area frames, and a lower end of the longitudinal extendable arm is coupled to the end coupling portion of the extendable arm of the other variable area frame, or a lower one of the two variable area frames.

In this case, for example, the end coupling portion includes inner end coupling shafts located on an inner side of the polygonal frame and outer end coupling shafts located on an outer side of the polygonal frame. The upper end of the longitudinal extendable arm is coupled to the inner end coupling shaft and the outer end coupling shaft of the extendable arm of one of the two variable area frames, or the upper one of the two variable area frames. The lower end of the longitudinal extendable arm is coupled to the inner end coupling shaft and the outer end coupling shaft of the extendable arm of the other variable area frame, or the lower one of the two variable area frames.

In another embodiment, the end coupling portion includes inner end coupling shafts located on an inner side of the polygonal frame and outer end coupling shafts located on an outer side of the polygonal frame. An upper end of the longitudinal extendable arm is coupled to two of the inner end coupling shafts, two of the outer end coupling shafts, or two of the middle coupling shafts of the extendable arm of one of the two variable area frames, or an upper one of the two variable area frames. Similarly, a lower end of the longitudinal extendable arm is coupled to two of the inner end coupling shafts, two of the outer end coupling shafts, or two of the middle coupling shafts of the extendable arm of the other variable area frame, or a lower one of the two variable area frames.

An example of applications of the present invention is an assembling toy. The assembling toy includes: a plurality of the variable area frames according to any one of the above aspects; and/or a plurality of the variable volume three-dimensional structures according to any one of the above aspects.

According to the present invention having the above configuration, the area of the polygonal frame and the volume of the three-dimensional structure can be changed according to an extending/contracting operation of the extendable arms.

DESCRIPTION OF EMBODIMENTS

Figure 1:
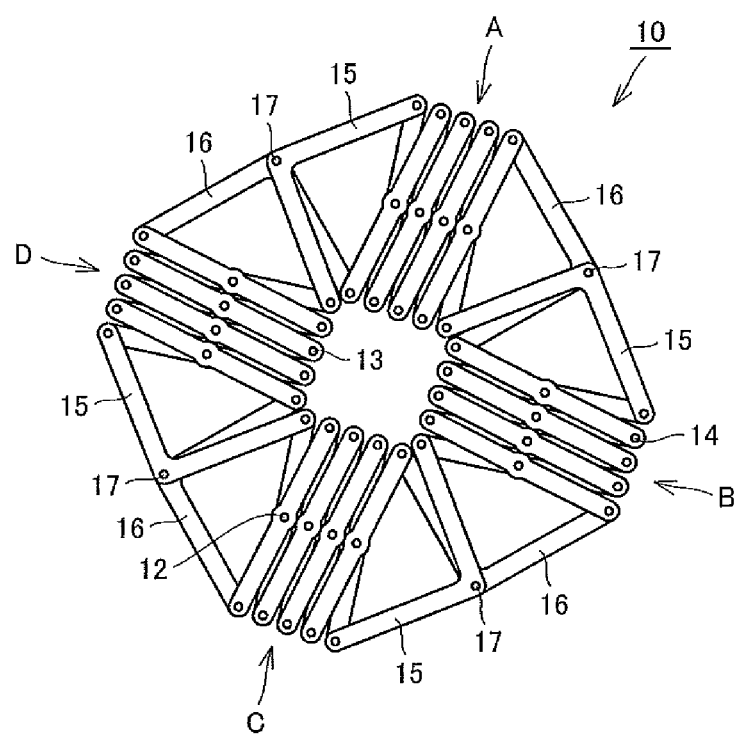
FIG. 1 is a plan view of a quadrilateral frame according to an embodiment of the present invention, showing the state where the quadrilateral frame has the smallest area.
Figure 2:
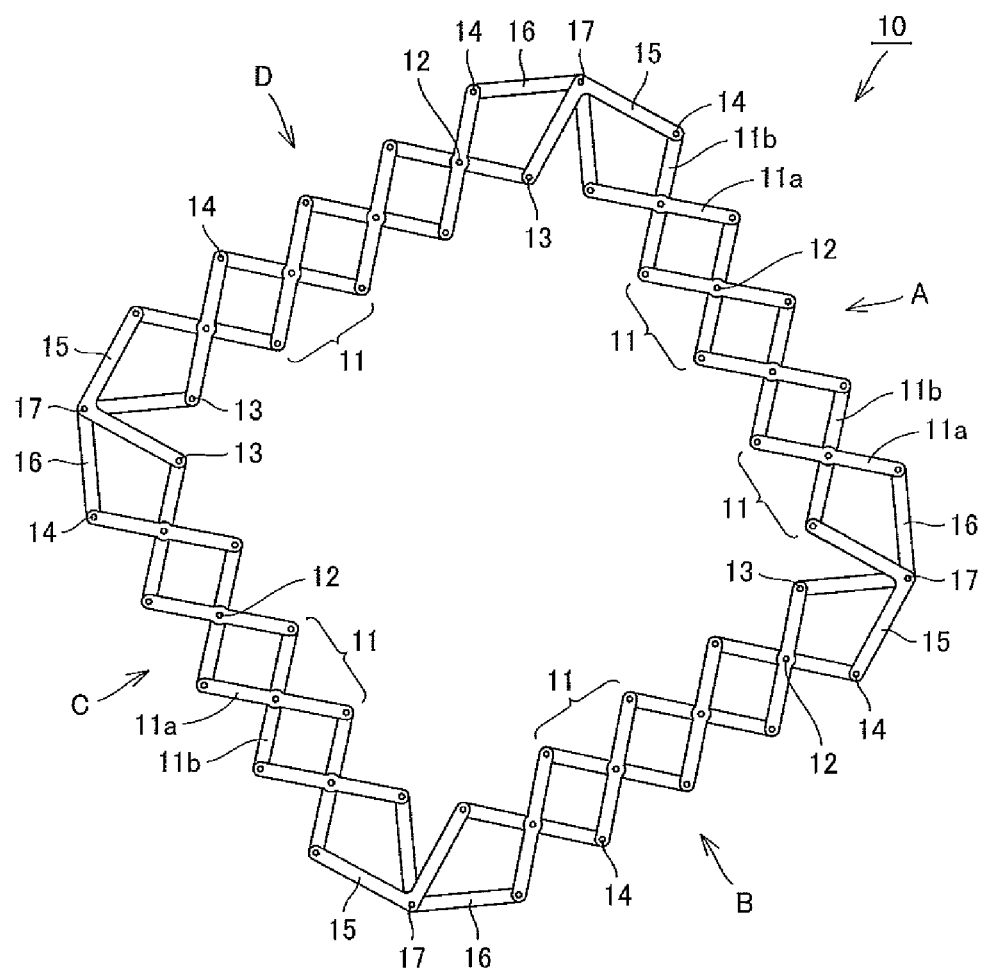
FIG. 2 is a plan view of the quadrilateral frame according to the embodiment of the present invention, showing the state where the quadrilateral frame has an intermediate area.
Figure 3:
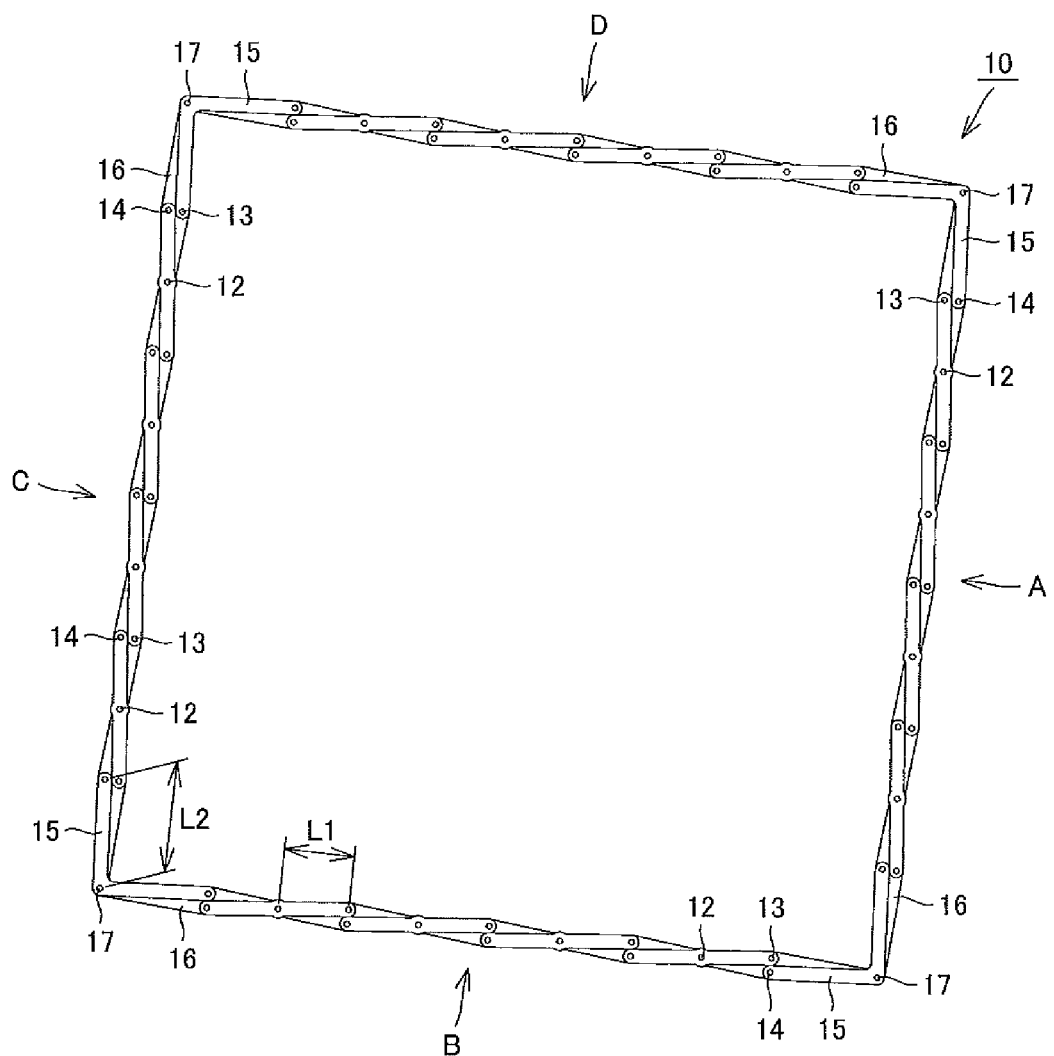
FIG. 3 is a plan view of the quadrilateral frame according to the embodiment of the present invention, showing the state where the quadrilateral frame has the largest area.

FIGS. 1 to 3 show a first embodiment of a variable area frame according to the present invention. The variable area frame has a quadrilateral shape as an example of a polygonal shape. FIG. 1 shows the state where the area surrounded by the outer contour of the frame is the smallest. FIG. 2 shows the state where this area has an intermediate value. FIG. 3 shows the state where this area is the largest.

FIGS. 1 to 3 illustrate a quadrilateral variable area frame by way of example. However, the configuration and the operation are basically the same even if the variable area frame has other polygonal shapes such as a triangular, pentagonal, or hexagonal shape.

The configuration of the quadrilateral frame 10 will be described below mainly with reference to FIG. 2.

As shown in the figure, the four sides of the quadrilateral frame 10 are formed by four extendable arms A, B, C, D, and the length of each side changes according to an extending/contracting operation of the extendable arm A, B, C, D. The quadrilateral frame 10 includes a coupling mechanism that couples adjoining two of the extendable arms A, B, C, D so that these two extendable arms can move together. The coupling mechanism thus allows adjoining two of the four sides of the quadrilateral frame 10 to extend and contract together. The coupling mechanism will be described later.

Each extendable arm A, B, C, D includes a plurality of cross units 11 and an end coupling portion. Each cross unit 11 is formed by two rigid members 11a, 11b and a middle coupling shaft 12. The two rigid members 11a, 11b are placed so as to cross each other to form an X-shape, and are pivotally coupled by the middle coupling shaft 12. The end coupling portion pivotally couples the ends of adjoining ones of the cross units 11.

In the illustrated embodiment, the end coupling portion includes inner end coupling shafts 13 and outer end coupling shafts 14. The inner end coupling shafts 13 are located on the inner side of the quadrilateral frame 10, and the outer end coupling shafts 13 are located on the outer side of the quadrilateral frame 10. Looking at the shape of one rigid member as a constituent element of the cross unit 11, an imaginary line connecting the inner end coupling shaft 13, the middle coupling shaft 12, and the outer end coupling shaft 14 extends linearly as viewed in top plan. The rigid member may have any shape as long as the imaginary line connecting the three coupling shafts extends linearly as viewed in plan. The rigid member may have a curved shape like an S-shape or a Z-shape as viewed in plan, or may have a curved shape like an arc shape in the thickness direction.

The coupling mechanism that couples adjoining two of the extendable arms A, B, C, D so that these two extendable arms can move together includes a first bent member 15, a second bent member 16, and a corner coupling shaft 17 at each corner of the quadrilateral frame 10. The first and second bent members 15, 16 have a bent shape like a V-shape. Each corner coupling shaft 17 pivotally couples the first and second bent members 15, 16 at their intersection (the position of their bend points).

The first bent member 15 pivotally couples the inner end coupling shaft 13 of the extendable arm of one of adjoining two of the four sides of the quadrilateral frame 10 and the outer end coupling shaft 14 of the extendable arm of the other side. The second bent member 16 pivotally couples the outer end coupling shaft 14 of the extendable arm of the one side of the quadrilateral frame 10 and the inner end coupling shaft 13 of the extendable arm of the other side.

In order to increase or reduce the area of the frame 10 so as to maintain similarity of the resultant shapes of the frame 10, namely without changing the shape of the frame 10 from its original polygonal shape, the first and second bent members 15, 16 need to have a predetermined bend angle. Specifically, the first and second bent members 15, 16 need to have a bend angle of A/n, where A represents the sum of interior angles of an n-gon. For example, in the case of a quadrilateral frame, the bend angle of each bent member is 90 degrees. In the case of an equilateral triangular frame, the bend angle of each bent member is 60 degrees. In the case of a regular pentagonal frame, the bend angle of each bent member is 108 degrees. In the case of a regular hexagonal frame, the bend angle of each bent member is 120 degrees.

The relationship in length between each rigid member 11a, 11b as a constituent element of each cross unit 11 and each bent member 15, 16 will be described. The value of L2/L1 is about 1 to 2.16 for an equilateral triangular frame, about 1 to 1.5 for a quadrilateral frame, about 1 to 1.32 for a regular pentagonal frame, and about 1 to 1.23 for a regular hexagonal frame, where L1 represents the interval between the middle coupling shaft 12 and the inner end coupling shaft 13 and the interval between the middle coupling shaft 12 and the outer end coupling shaft 14 in each rigid member 11a, 11b, and L2 represents the interval between the corner coupling shaft 17 and the inner end coupling shaft 13 and the interval between the corner coupling shaft 17 and the outer end coupling shaft 14 in each bent member 15, 16 (see FIG. 3). The larger the value of L2/L1 is in the above range, the larger the degree to which the area of the frame changes is.

The extendable arm forming each side of the polygonal frame is formed by linearly connecting a plurality of cross units 11 in a direction in which the extendable arm extends and contracts. In the case of forming a regular polygonal frame, the number of cross units 11 forming each side of the regular polygonal frame is the same integer value. The length of each rigid member forming each cross unit 11 is the same.

When the quadrilateral frame 10 has the smallest area as shown in FIG. 1, each cross unit 11 is in a folded state, and the extendable arms A, B, C, D of each side of the quadrilateral frame 10 have the shortest length.

When the quadrilateral frame 10 has the intermediate area as shown in FIG. 2, each cross unit 11 is opened until the two rigid members 11a, 11b are perpendicular to each other, and the extendable arms A, B, C, D of each side of the quadrilateral frame 10 have an intermediate length.

When the quadrilateral frame 10 has the largest area as shown in FIG. 3, each cross unit 11 is in a fully opened state, and the inner end coupling shafts 13 of the two rigid members 11a, 11b are located close to the outer end coupling shafts 14 thereof. In this state, the extendable arms A, B, C, D of each side of the quadrilateral frame 10 have the longest length.

The operation of changing the area of the frame, or the operation of extending and contracting the extendable arms, may be performed either manually or by using a driving device such as a motor.

Figure 4:
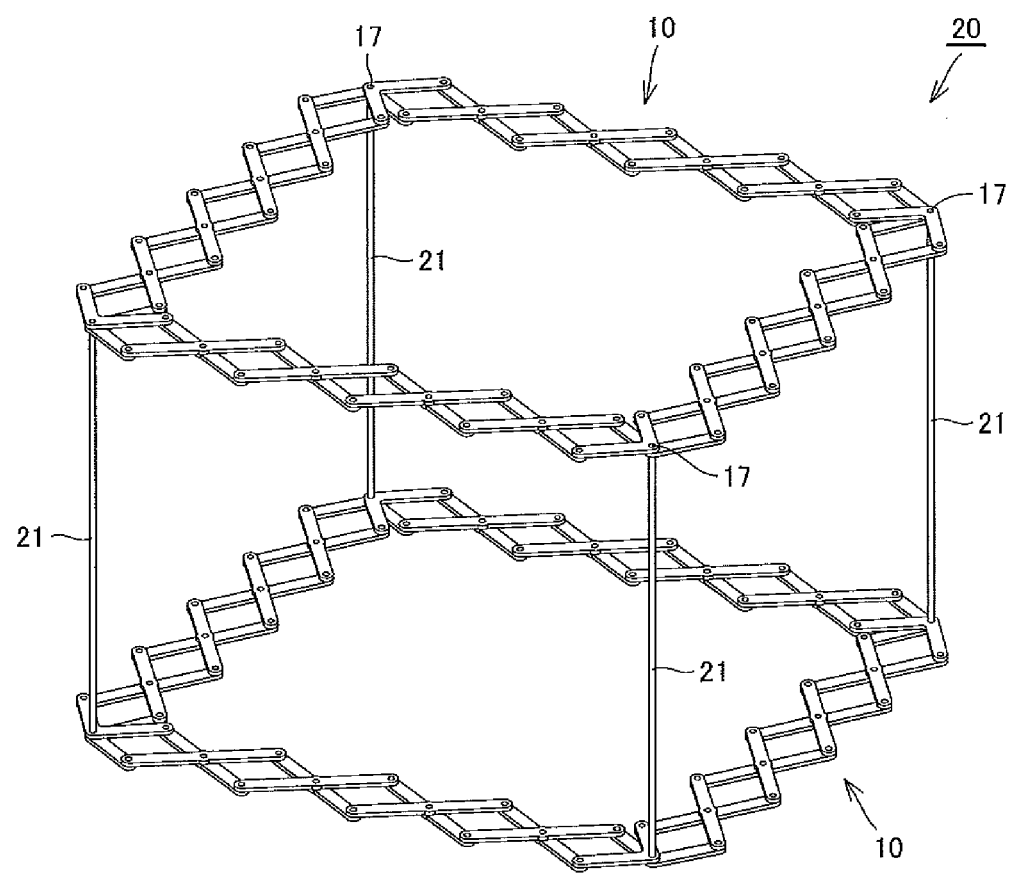
FIG. 4 is a perspective view of a variable volume three-dimensional structure according to an embodiment of the present invention.

FIG. 4 shows an example of a variable volume three-dimensional structure. A variable volume three-dimensional structure 20 shown in FIG. 4 includes longitudinal coupling members that couple two of the quadrilateral frames 10 shown in FIGS. 1 to 3 such that the two quadrilateral frames 10 are separated from and parallel to each other. In the illustrated example, the longitudinal coupling members have a fixed longitudinal length. Specifically, the longitudinal coupling members are four bars 21 having a fixed length. The four bars 21 are located at the corners of the quadrilateral frames 10. Each bar 21 couples the corner coupling shafts 17 of the upper and lower quadrilateral frames 10.

According to the variable volume three-dimensional structure 20 of the embodiment shown in FIG. 4, the volume of the variable volume three-dimensional structure 20 increases and decreases according to an increase and decrease in area of the quadrilateral frames 10. The variable volume three-dimensional structure 20 has a fixed height.

Figure 5:
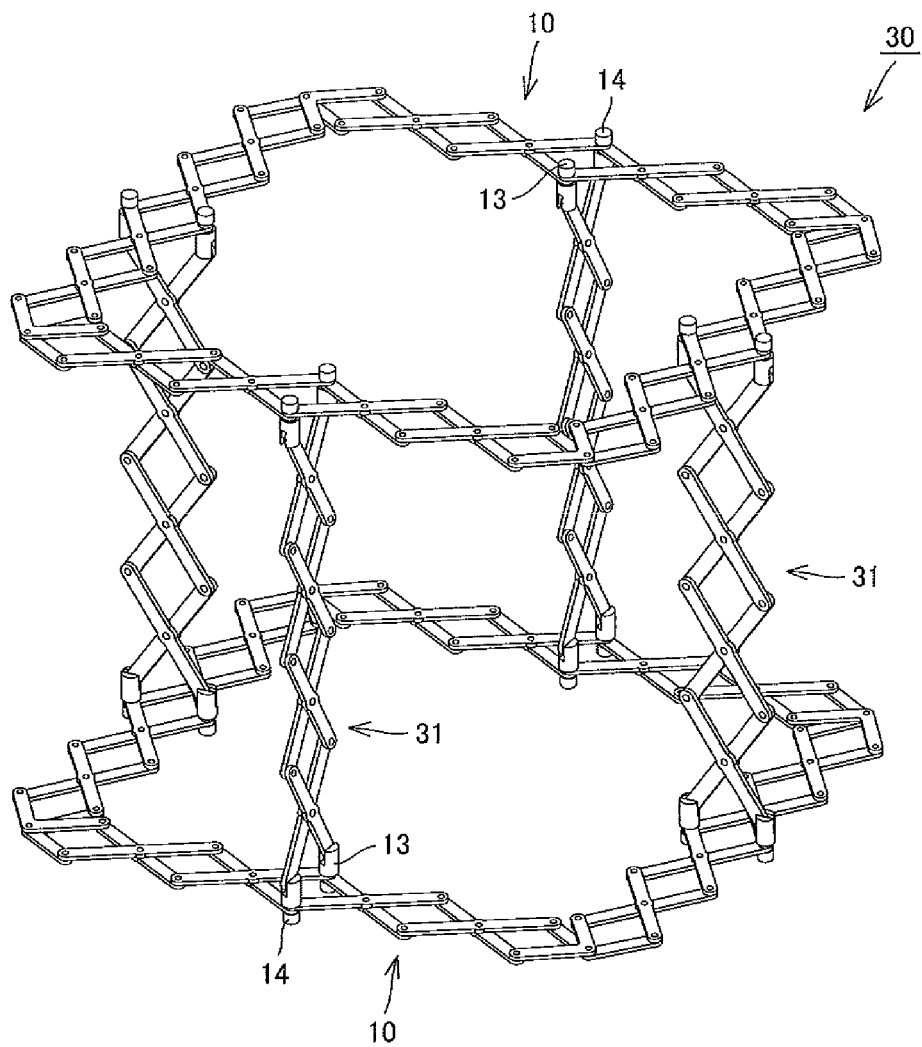
FIG. 5 is a perspective view of a variable volume three-dimensional structure according to another embodiment of the present invention, showing the state where the variable volume three-dimensional structure has an intermediate volume.
Figure 6:
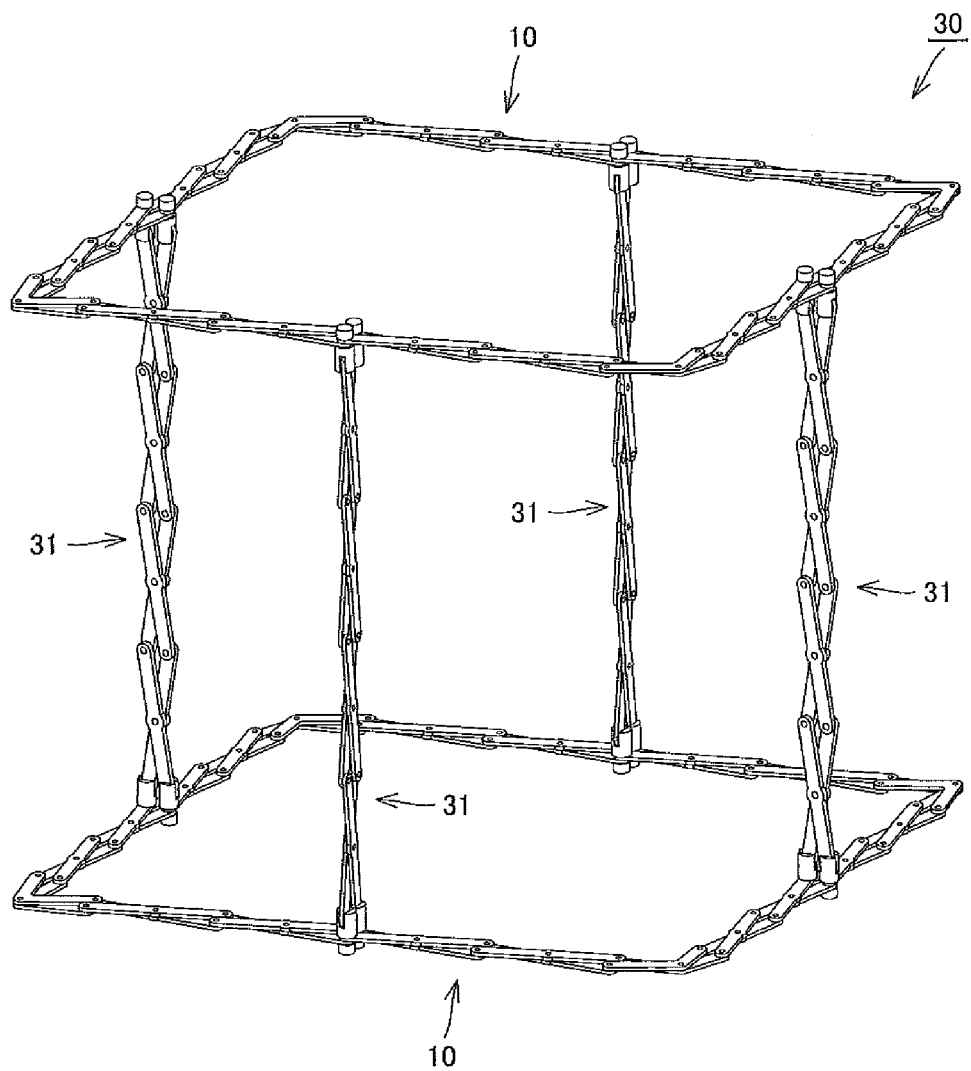
FIG. 6 is a perspective view of the variable volume three-dimensional structure according to the another embodiment of the present invention, showing the state where the variable volume three-dimensional structure has the largest volume.
Figure 7:
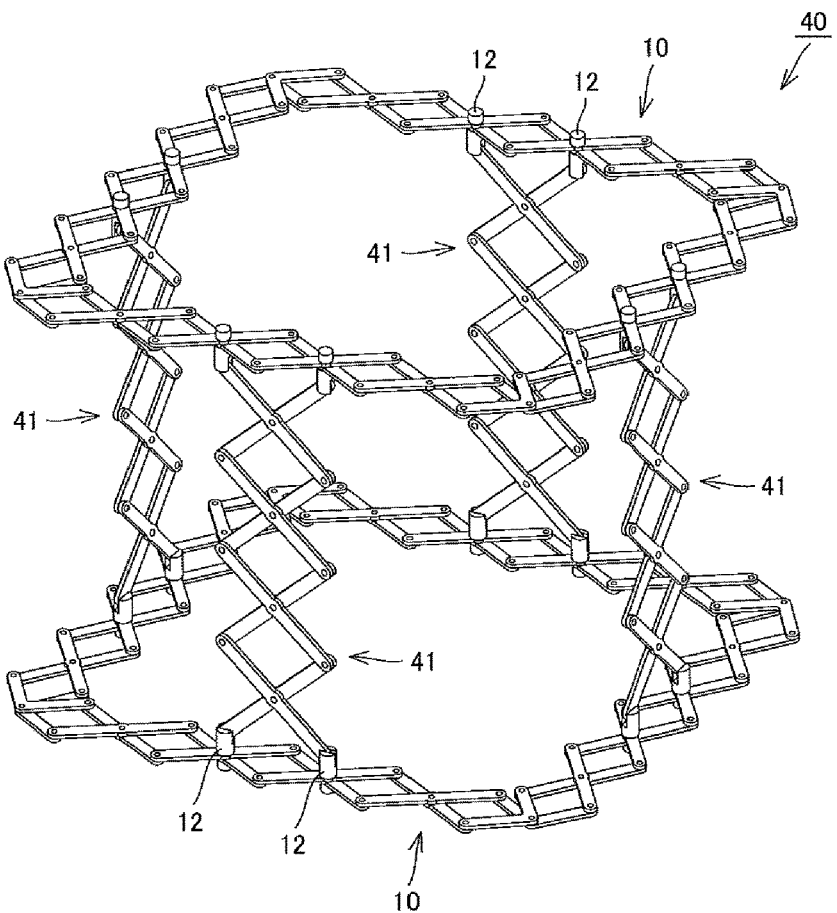
FIG. 7 is a perspective view of a variable volume three-dimensional structure according to still another embodiment of the present invention, showing the state where the variable volume three-dimensional structure has an intermediate volume.
Figure 8:
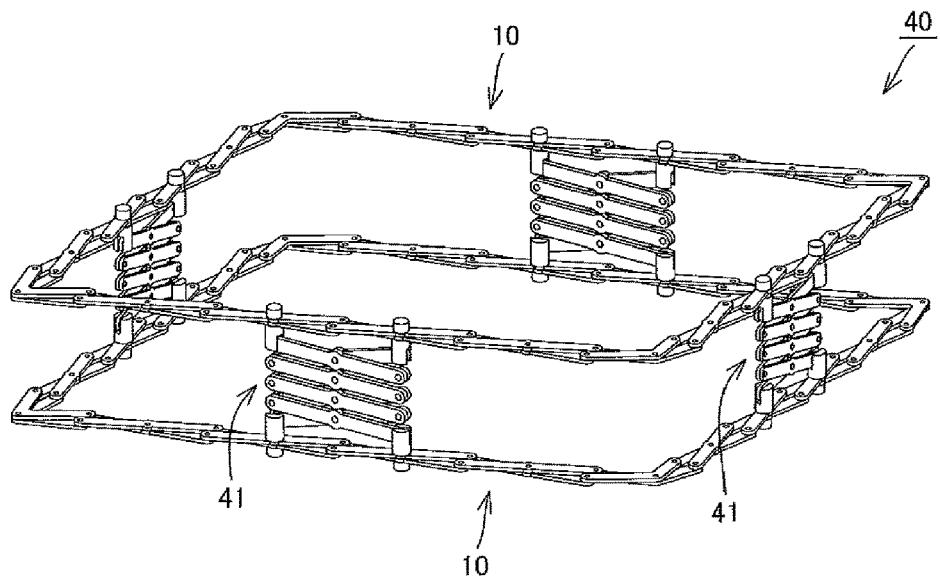
FIG. 8 is a perspective view of the variable volume three-dimensional structure according to the still another embodiment of the present invention, showing the state where frames have the largest area and longitudinal coupling members have the smallest height.
Figure 9A:
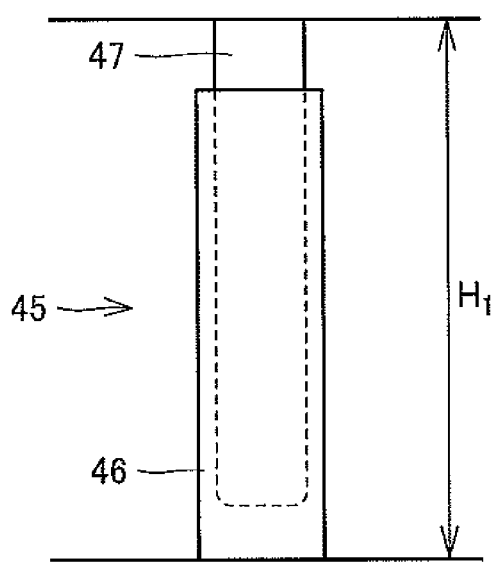
FIGS. 9A and 9B are diagrams illustrating another example of the longitudinal coupling member.
Figure 9B:
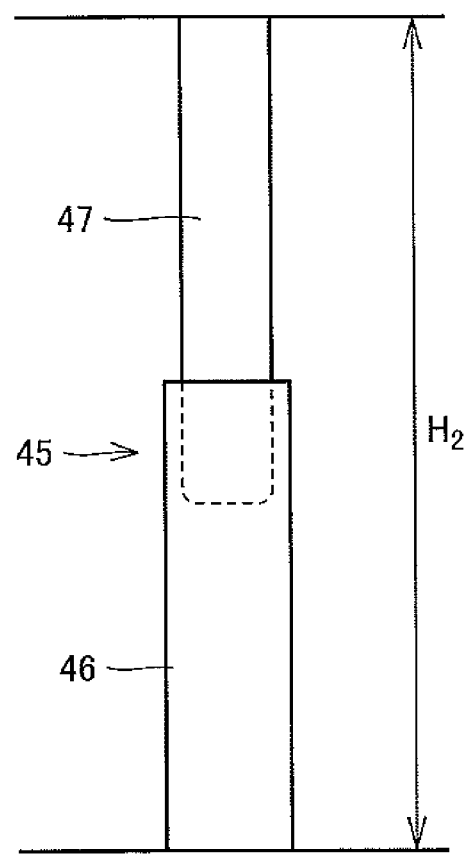

The longitudinal coupling members may have a variable longitudinal length. FIGS. 5 to 9B show embodiments in which the longitudinal coupling members have a variable longitudinal length. The embodiment of FIGS. 5 and 6 shows a variable volume three-dimensional structure whose height increases as the area of the variable area frames increases, and decreases as the area of the variable area frames decreases. The embodiment of FIGS. 7 and 8 shows a variable volume three-dimensional structure whose height decreases as the area of the variable area frames increases, and increases as the area of the variable area frames decreases. The embodiment of FIGS. 9A and 9B shows a longitudinal coupling member whose height can be changed regardless of an increase and decrease in area of the variable area frames.

The embodiment of FIGS. 5 and 6 will be described. A three-dimensional structure 30 according to the illustrated embodiment is a three-dimensional structure whose height changes according to a change in area of the upper and lower variable area frames 10. As can be seen from FIGS. 5 and 6, the upper and lower quadrilateral frames 10 have a larger area and longitudinal coupling members 31 have a greater height in the form of FIG. 6 than in the form of FIG. 5. Each longitudinal coupling member 31 is a longitudinal extendable arm formed by connecting in a longitudinal direction cross units each formed by two rigid members crossing each other to form an X-shape. The upper ends of the longitudinal extendable arms 31 are coupled to the end coupling portions of the extendable arms of one of the quadrilateral frames 10, namely the upper quadrilateral frame 10. The lower ends of the longitudinal extendable arms 31 are coupled to the end coupling portions of the extendable arms of the other quadrilateral frame 10, namely the lower quadrilateral frame 10. Specifically, the upper end of each longitudinal extendable arm 31 is coupled to the inner end coupling shaft 13 and the outer end coupling shaft 14 of the upper quadrilateral frame 10, and the lower end of each longitudinal extendable arm 31 is coupled to the inner end coupling shaft 13 and the outer end coupling shaft 14 of the lower quadrilateral frame 10.

When the upper and lower quadrilateral frames 10 are operated so that their area is increased, the interval between the inner and outer end coupling shafts 13, 14 decreases accordingly. Each longitudinal extendable arm 31 having its upper and lower ends coupled to the inner and outer end coupling shafts 13, 14 of the upper and lower quadrilateral frames 10 thus decreases in lateral dimension and increases in longitudinal length accordingly. On the other hand, when the upper and lower quadrilateral frames 10 are operated so that their area is decreased, the interval between the inner and outer end coupling shafts 13, 14 increases accordingly. Each longitudinal extendable arm 31 having its upper and lower ends coupled to the inner and outer end coupling shafts 13, 14 of the upper and lower quadrilateral frames 10 thus increases in lateral dimension and decreases in longitudinal length accordingly.

The embodiment of FIGS. 7 and 8 will be described. A three-dimensional structure 40 of the illustrated embodiment is a three-dimensional structure whose height changes according to a change in area of the upper and lower variable area frames 10. As can be seen from FIGS. 7 and 8, the upper and lower quadrilateral frames 10 have a larger area and longitudinal coupling members 41 have a lower height in the form of FIG. 8 than in the form of FIG. 7. Each longitudinal coupling member 41 is a longitudinal extendable arm formed by connecting in a longitudinal direction cross units each formed by two rigid members crossing each other to form an X-shape. The upper end of each longitudinal extendable arm 41 is coupled to two of the middle coupling shafts 12 of the upper quadrilateral frame 10. The lower end of each longitudinal extendable arm 41 is coupled to two of the middle coupling shafts 12 of the lower quadrilateral frame 10.

When the upper and lower quadrilateral frames 10 are operated so that their area is increased, the interval between the two middle coupling shafts 12 in each quadrilateral frame 10 increases accordingly. Each longitudinal extendable arm 41 having its upper and lower ends coupled to the two middle coupling shafts 12 of the upper and lower quadrilateral frames 10 thus increases in lateral dimension and decreases in longitudinal length accordingly. On the other hand, when the upper and lower quadrilateral frames 10 are operated so that their area is decreased, the interval between the two middle coupling shafts 12 decreases accordingly. Each longitudinal extendable arm 41 having its upper and lower ends coupled to the two middle coupling shafts 12 of the upper and lower quadrilateral frames 10 thus decreases in lateral dimension and increases in longitudinal length accordingly.

As a modification of the embodiment shown in FIGS. 7 and 8, the upper and lower ends of each longitudinal coupling member 41 may be coupled to two of the outer end coupling shafts 14 or two of the inner end coupling shafts 13 of the upper and lower variable area frames 10 instead of being coupled to two of the middle coupling shafts 12 of the upper and lower variable area frames 10. The variable volume three-dimensional structure of this modification operates substantially in the same manner as that of the embodiment shown in FIGS. 7 and 8.

FIGS. 9A and 9B show a further example of the longitudinal coupling member that couples the upper and lower variable area frames 10 such that the upper and lower variable area frames 10 are separated from and parallel to each other. A longitudinal coupling member 45 shown in FIGS. 9A and 9B is a bar having a variable length. Specifically, the longitudinal coupling member 45 includes a tube 46 extending in a longitudinal direction and an insertion body 47 extending in the longitudinal direction and slidably fitted in the tube 46. The longitudinal coupling member 45 satisfies $H_2 > H_1$, where $H_1$ represents the height of the longitudinal coupling member 45 with the insertion body 47 inserted deep into the tube 46 as shown in FIG. 9A, and $H_2$ represents the height of the longitudinal coupling member 45 with the insertion body 47 extended from the tube 46 to a large extent as shown in FIG. 9B. The interval between the upper and lower frames 10 can be set to any desired value by fixing the insertion body 47 at any desired height position by using a lock pin etc.

Figure 10:
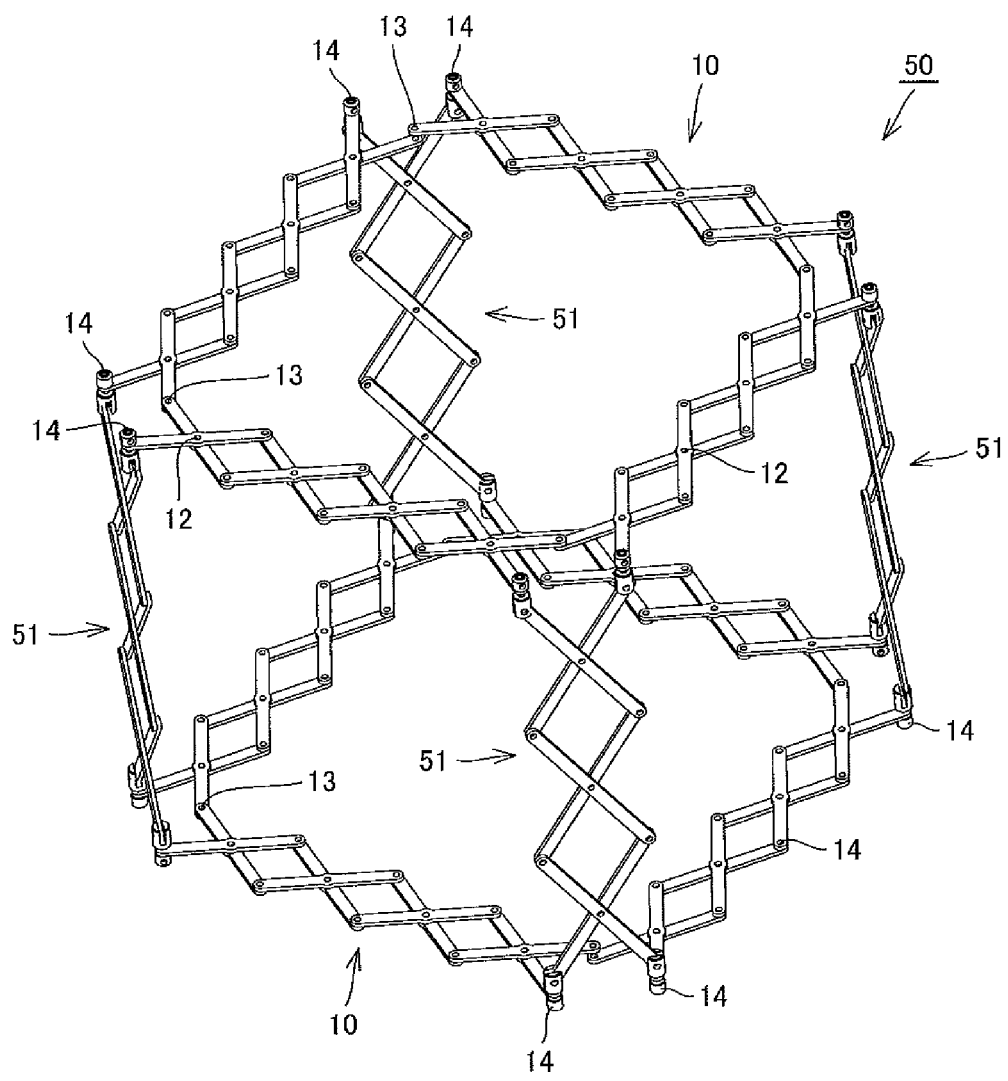
FIG. 10 is a perspective view of a variable volume three-dimensional structure according to yet another embodiment of the present invention.

FIG. 10 shows a further embodiment of the variable volume three-dimensional structure. A three-dimensional structure 50 shown in FIG. 10 includes upper and lower quadrilateral frames 10 and four longitudinal extendable arms 51 as longitudinal coupling members that couple the upper and lower quadrilateral frames 10. The quadrilateral frames 10 of FIG. 10 are different from the quadrilateral frame 10 of FIGS. 1 to 3 only in that the quadrilateral frames 10 of FIG. 10 do not include the first and second bent members. Since the configuration of the quadrilateral frames 10 of FIG. 10 is otherwise the same as that of the quadrilateral frame 10 of FIGS. 1 to 3, the same elements are denoted with the same reference characters, and description thereof will be omitted.

In each quadrilateral frame 10 of the embodiment shown in FIG. 10, adjoining two of the extendable arms are coupled together by a common inner end coupling shaft 13 at the corner. The outer end coupling shaft 14 of one of the adjoining two extendable arms and the outer end coupling shaft 14 of the other extendable arm are coupled together by a longitudinal extendable arm 51 formed by connecting cross units in a longitudinal direction.

Each longitudinal extendable arm 51 coupling the outer end coupling shafts 14 of adjoining two of the extendable arms in each quadrilateral frame 10 functions to couple the adjoining two extendable arms so that these two extendable arms can move together. Moreover, each longitudinal extendable arm 51 extends and contracts according to an extending/contracting operation of the extendable arms of the quadrilateral frames 10. In the embodiment shown in FIG. 10, when the upper and lower quadrilateral frames 10 are operated so that their area is increased, the height of the four longitudinal extendable arms 51 increases accordingly, and the volume of the three-dimensional structure 50 also increases accordingly. On the other hand, when the upper and lower quadrilateral frames 10 are operated so that their area is decreased, the height of the four longitudinal extendable arms 51 decreases accordingly, and the volume of the three-dimensional structure 50 also decreases accordingly.

Figure 11:
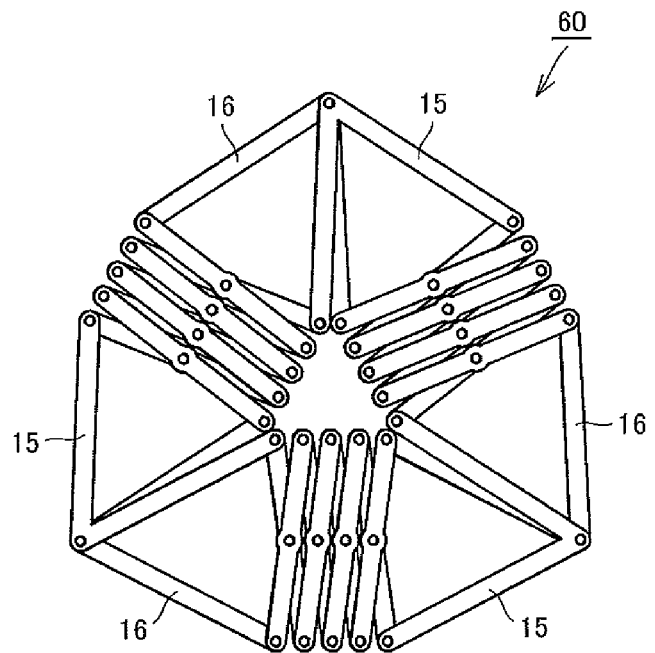
FIG. 11 is a plan view of an equilateral triangular frame according to a further embodiment of the present invention, showing the state where the equilateral triangular frame has the smallest area.
Figure 12:
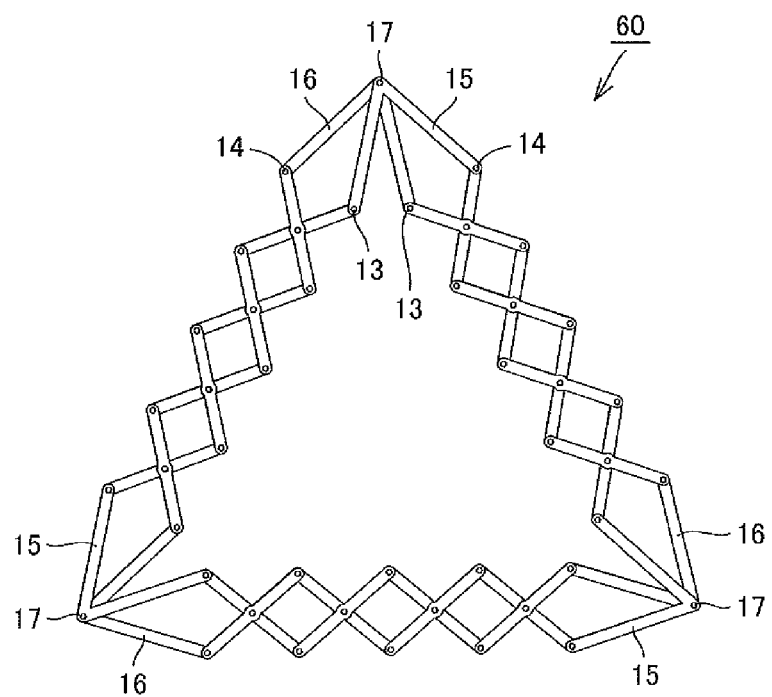
FIG. 12 is a plan view of the equilateral triangular frame according to the further embodiment of the present invention, showing the state where the equilateral triangular frame has an intermediate area.
Figure 13:
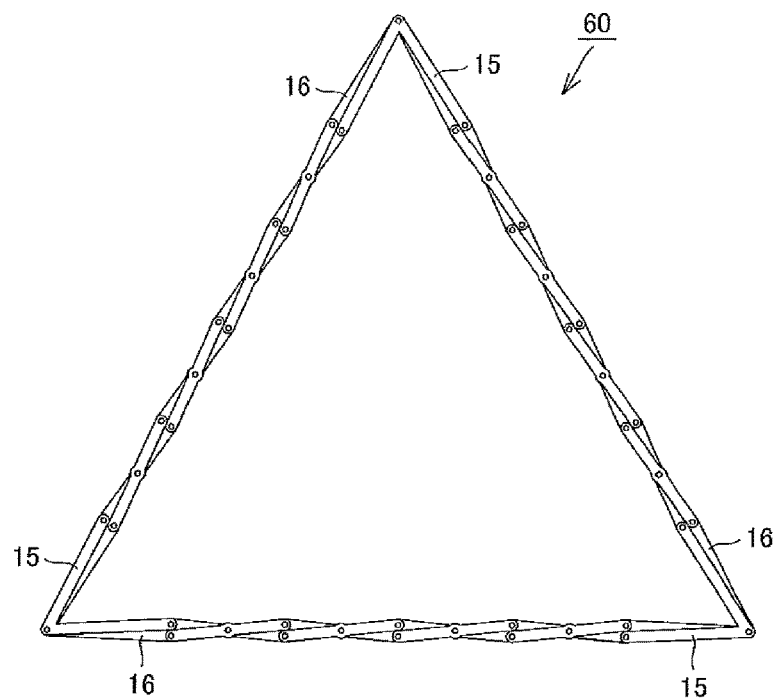
FIG. 13 is a plan view of the equilateral triangular frame according to the further embodiment of the present invention, showing the state where the equilateral triangular frame has the largest area.

FIGS. 11 to 13 show an equilateral triangular frame 60 as a further example of the polygonal frame. As in the embodiment shown in FIGS. 1 to 3, each side of the equilateral triangular frame 60 is formed by an extendable arm formed by connecting a plurality of cross units. The elements that are the same as or correspond to those in the above embodiments are denoted with the same reference characters as in the above embodiments, and description thereof will be omitted.

FIG. 11 shows the state where the equilateral triangular frame 60 has the smallest area. FIG. 12 shows the state where the equilateral triangular frame 60 has an intermediate area. FIG. 13 shows the state where the equilateral triangular frame 60 has the largest area.

In the embodiment shown in FIGS. 11 to 13, the first bent member 15 at each corner of the equilateral triangular frame 60 pivotally couples the inner end coupling shaft 13 of the extendable arm of one of adjoining two of the three sides of the equilateral triangular frame 60 and the outer end coupling shaft 14 of the extendable arm of the other side. The second bent member 16 at each corner of the equilateral triangular frame 60 pivotally couples the outer end coupling shaft 14 of the extendable arm of the one side of the equilateral triangular frame 60 and the inner end coupling shaft 13 of the extendable arm of the other side. The first and second bent members 15, 16 have a bent shape like a V-shape. Each corner coupling shaft 17 pivotally couples the first and second bent members 15, 16 at their intersection (the position of their bend points). The first and second bent members 15, 16 have a bend angle of 60 degrees.

When the equilateral triangular frame 60 has the smallest area as shown in FIG. 11, the extendable arms of each side of the equilateral triangular frame 60 have the shortest length. When the equilateral triangular frame 60 has the intermediate area as shown in FIG. 12, the extendable arms of each side of the equilateral triangular frame 60 have an intermediate length. When the equilateral triangular frame 60 has the largest area as shown in FIG. 13, the extendable arms of each side of the equilateral triangular frame 60 have the longest length.

Figure 14:
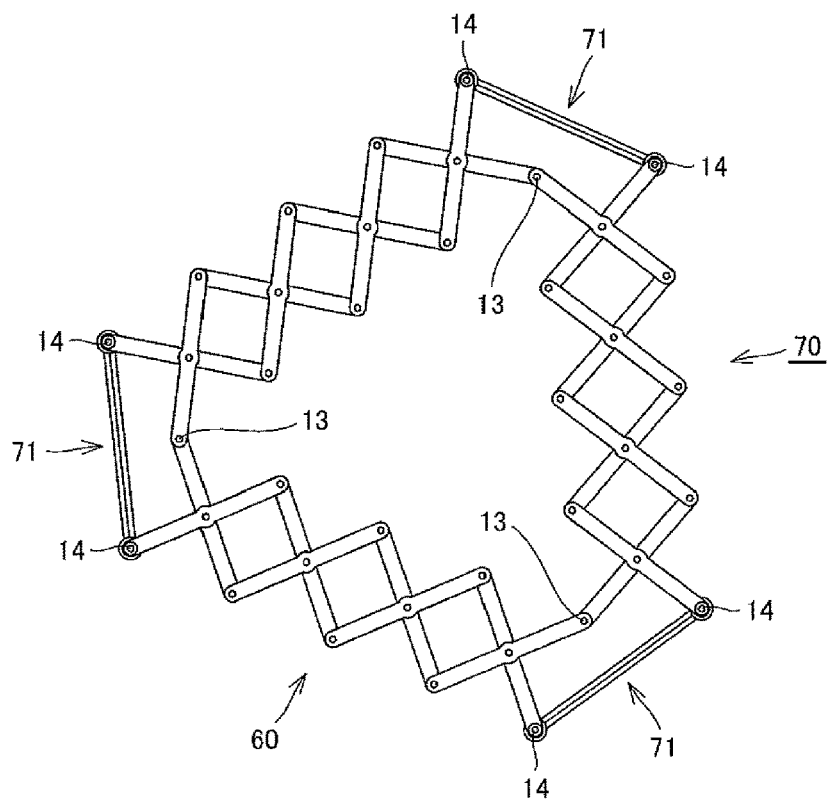
FIG. 14 is a plan view of a variable volume three-dimensional structure according to a still further embodiment of the present invention, showing the state where the variable volume three-dimensional structure has an intermediate volume.
Figure 15:
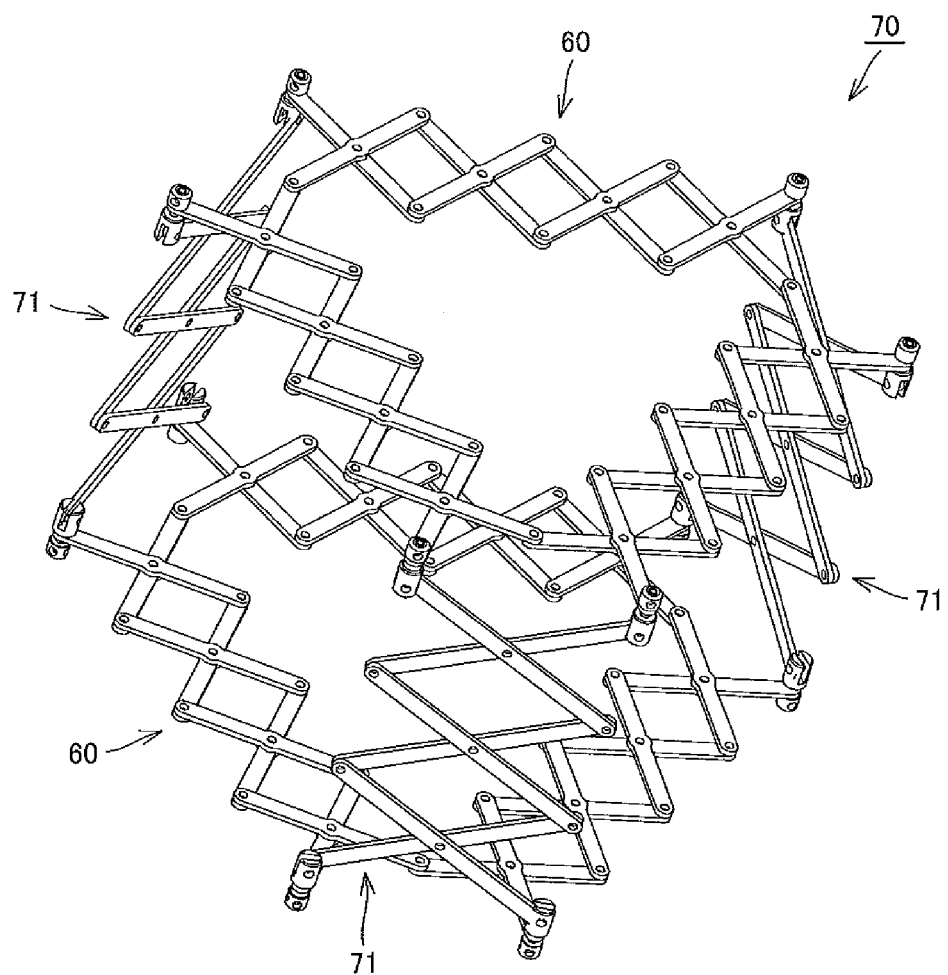
FIG. 15 is a perspective view of the variable volume three-dimensional structure according to the still further embodiment of the present invention, showing the state where the variable volume three-dimensional structure has the intermediate volume.
Figure 16:
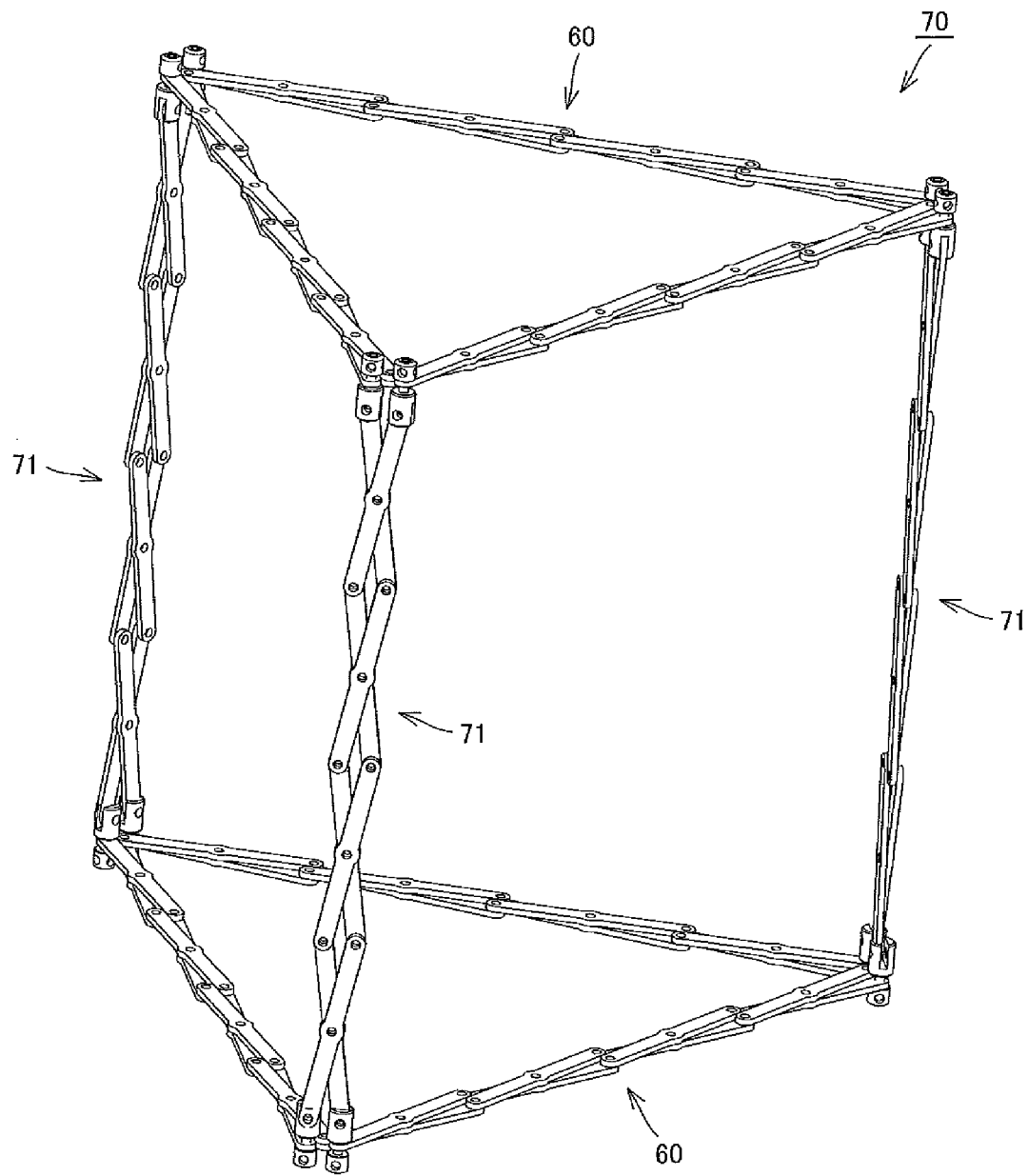
FIG. 16 is a perspective view of the variable volume three-dimensional structure according to the still further embodiment of the present invention, showing the state where the variable volume three-dimensional structure has the largest volume.

FIGS. 14 to 16 show a further embodiment of the variable volume three-dimensional structure. FIGS. 14 and 15 show a variable volume three-dimensional structure 70 having an intermediate volume, and FIG. 16 shows the variable volume three-dimensional structure 70 having the largest volume. The variable volume three-dimensional structure 70 shown in FIGS. 14 to 16 has the shape of a triangular prism. Specifically, the variable volume three-dimensional structure 70 includes upper and lower equilateral triangular frames 60 and three longitudinal extendable arms 71 as longitudinal coupling members coupling the upper and lower equilateral triangular frames 60. As in the above embodiments, each longitudinal extendable arm 71 is formed by connecting cross units in a longitudinal direction.

Each side of each equilateral triangular frame 60 is formed by an extendable arm formed by connecting cross units. In each equilateral triangular frame 60, adjoining two of the extendable arms are coupled together by a common inner end coupling shaft 13 at the corner. The outer end coupling shaft 14 of one of the adjoining two extendable arms and the outer end coupling shaft 14 of the other extendable arm are coupled together by the longitudinal extendable arm 71.

Each longitudinal extendable arm 71 coupling the outer end coupling shafts 14 of adjoining two of the extendable arms in each equilateral triangular frame 60 functions to couple the adjoining two extendable arms so that these two extendable arms can move together. Moreover, each longitudinal extendable arm 71 extends and contracts according to an extending/contracting operation of the extendable arms of the equilateral triangular frames 60. When the upper and lower equilateral triangular frames 60 are operated so that their area is increased, the height of the three longitudinal extendable arms 71 increases accordingly, and the volume of the three-dimensional structure 70 also increases accordingly. On the other hand, when the upper and lower equilateral triangular frames 60 are operated so that their area is decreased, the height of the three longitudinal extendable arms 71 decreases accordingly, and the volume of the three-dimensional structure 70 also decreases accordingly.

Figure 17:
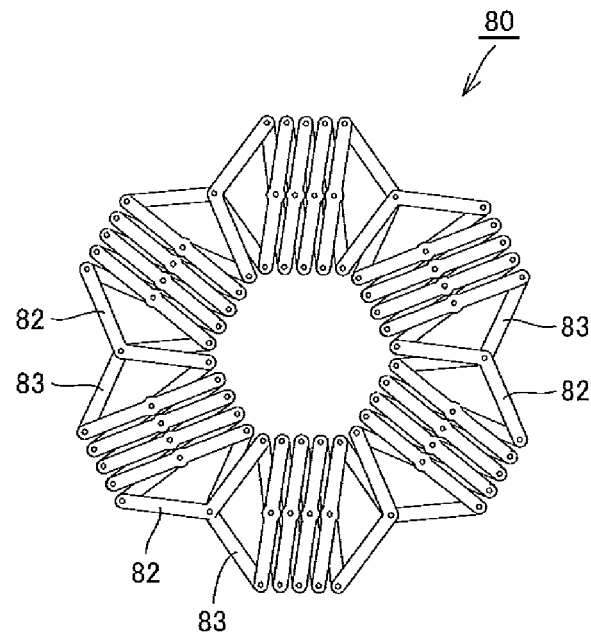
FIG. 17 is a plan view of a regular hexagonal frame according to a yet further embodiment of the present invention, showing the state where the regular hexagonal frame has the smallest area.
Figure 18:
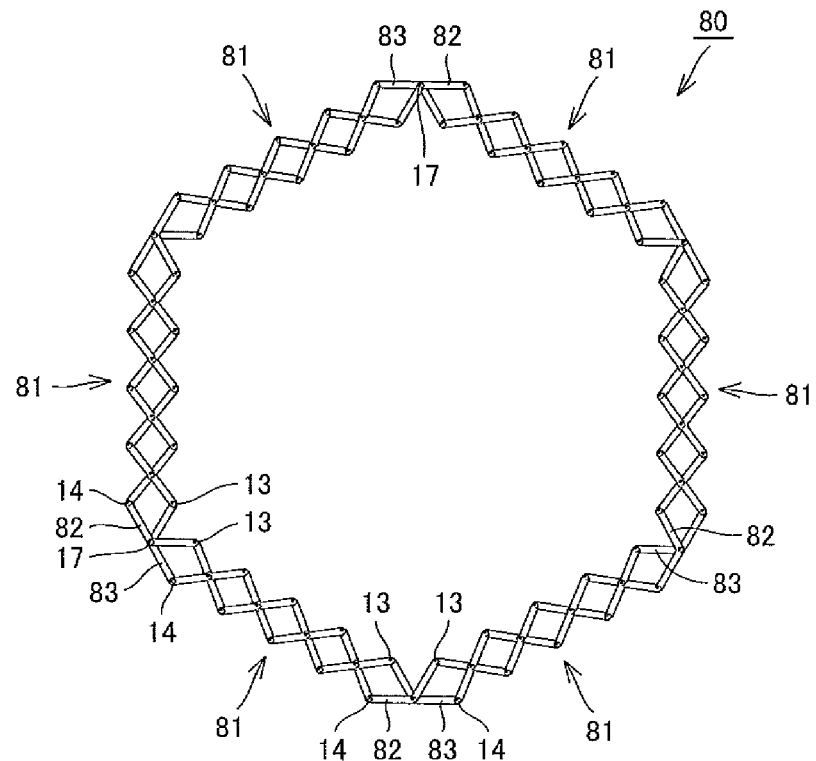
FIG. 18 is a plan view of the regular hexagonal frame according to the yet further embodiment of the present invention, showing the state where the regular hexagonal frame has an intermediate area.
Figure 19:
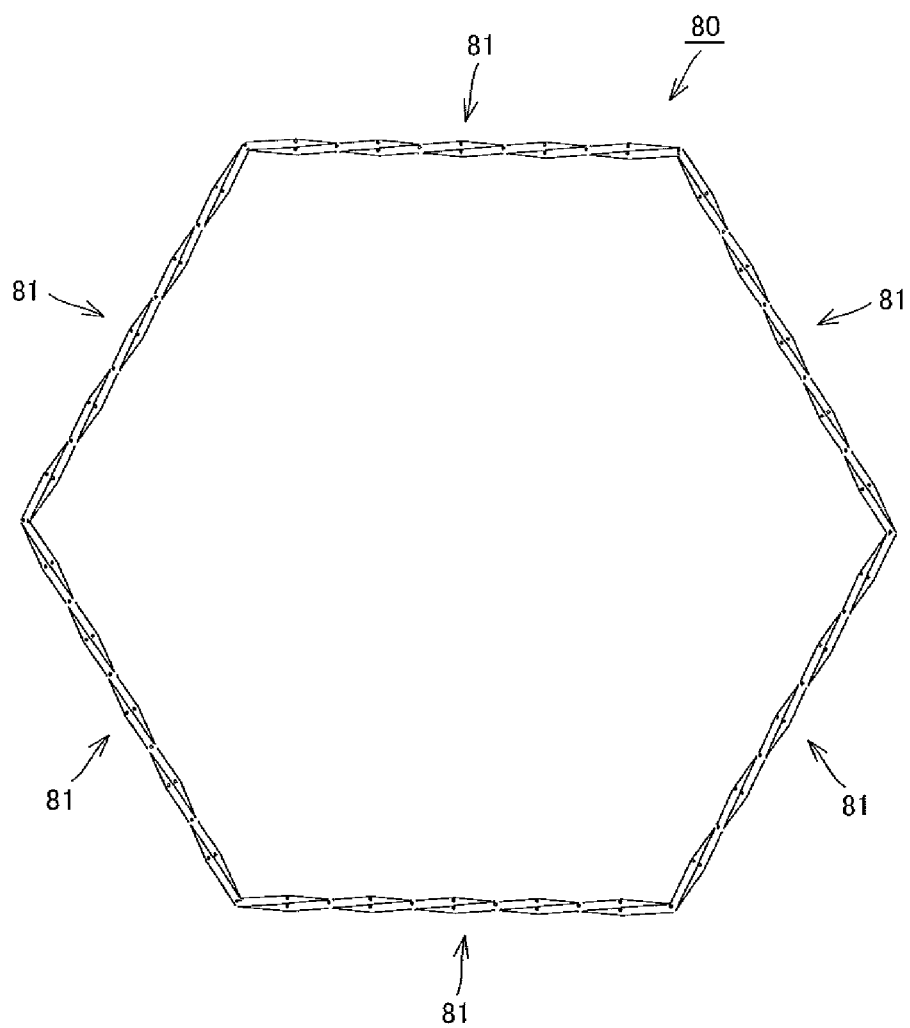
FIG. 19 is a plan view of the regular hexagonal frame according to the yet further embodiment of the present invention, showing the state where the regular hexagonal frame has the largest area.

FIGS. 17 to 19 show a regular hexagonal frame 80 as a further example of the polygonal frame. FIG. 17 shows the state where the regular hexagonal frame 80 has the smallest area. FIG. 18 shows the state where the regular hexagonal frame 80 has an intermediate area. FIG. 19 shows the state where the regular hexagonal frame 80 has the largest area.

The regular hexagonal frame 80 includes six extendable arms 81 forming each side of the regular hexagonal frame 80, and first and second bent members 82, 83 placed at each corner of the regular hexagonal frame 80. The first and second bent members 82, 83 at each corner of the regular hexagonal frame 80 couple adjoining two of extendable arms 81 so that these two extendable arms 81 can move together.

The first bent member 82 pivotally couples the inner end coupling shaft 13 of the extendable arm 81 of one of adjoining two of the six sides of the regular hexagonal frame 80 and the outer end coupling shaft 14 of the extendable arm of the other side. The second bent member 83 pivotally couples the outer end coupling shaft 14 of the extendable arm 81 of the one side of the regular hexagonal frame 80 and the inner end coupling shaft 13 of the extendable arm 81 of the other side. Each corner coupling shaft 17 pivotally couples the first and second bent members 82, 83 at their intersection (the position of their bend points). The first and second bent members 82, 83 have a bend angle of 120 degrees.

Although not shown in the figures, a three-dimensional structure having the shape of a hexagonal prism can be formed by placing upper and lower regular hexagonal frames 80 shown in FIGS. 17 to 19 at an interval such that the upper and lower regular hexagonal frames 80 are parallel to each other, and coupling the upper and lower regular hexagonal frames 80 by the longitudinal coupling members.

Figure 20:
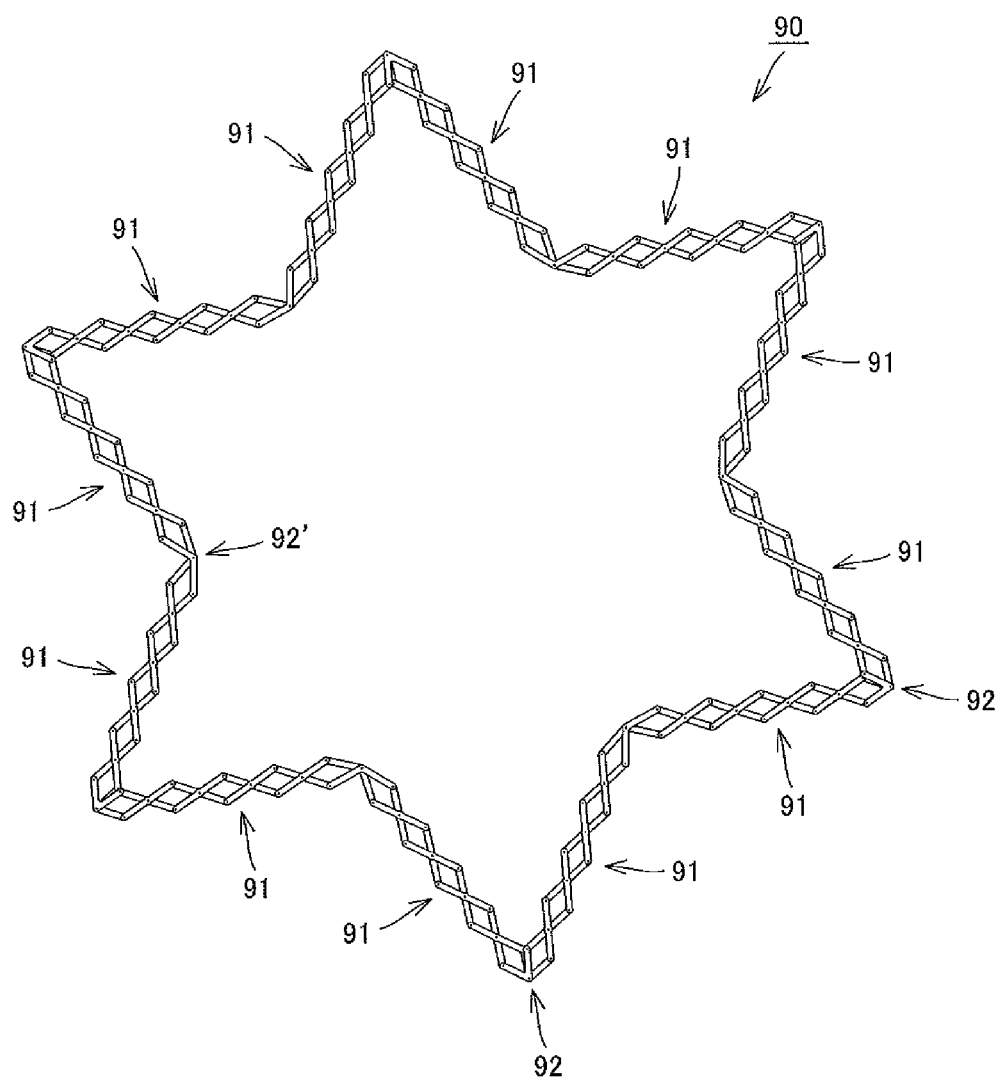
FIG. 20 is a plan view of a star-shaped frame according to a yet further embodiment of the present invention, showing the state where the star-shaped frame has an intermediate area.
Figure 21:
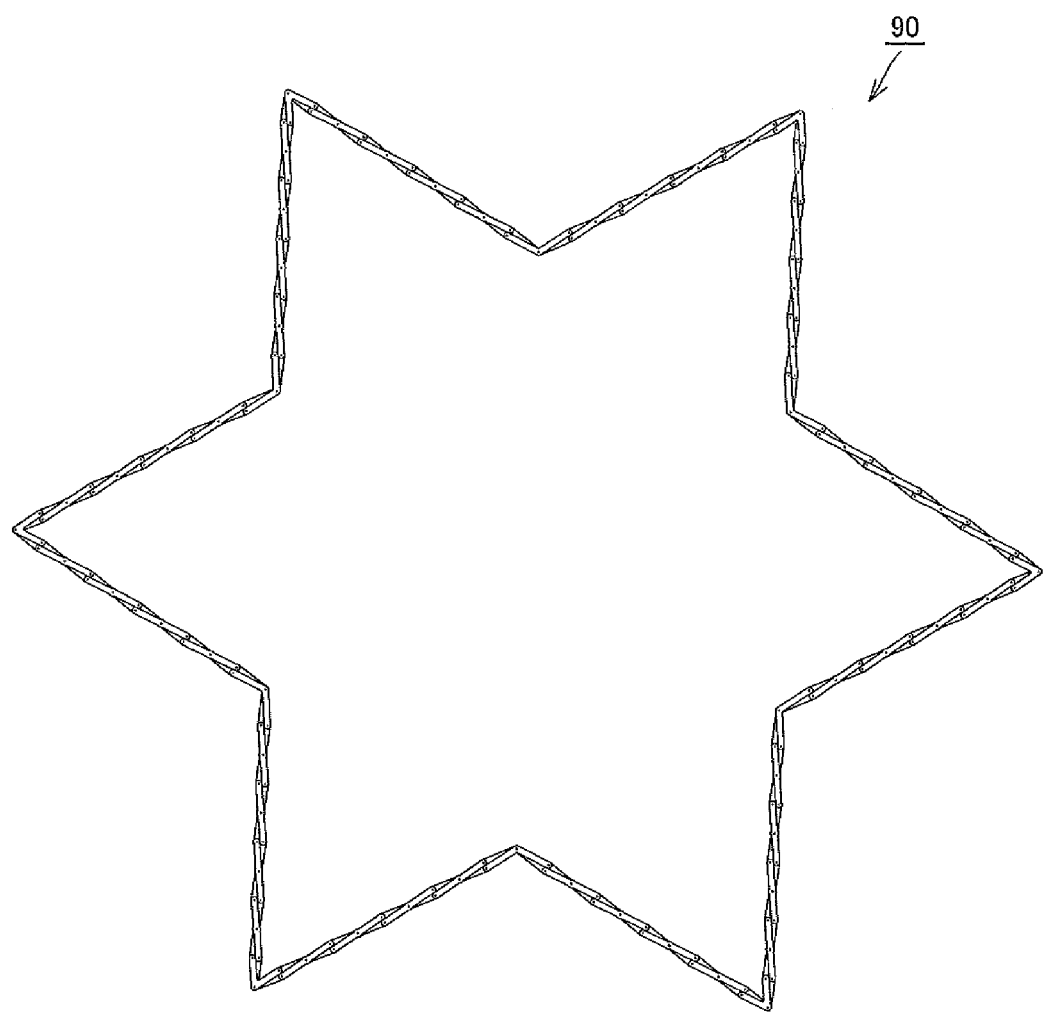
FIG. 21 is a plan view of the star-shaped frame according to the yet further embodiment of the present invention, showing the state where the star-shaped frame has the largest area.

FIGS. 20 and 21 show a star-shaped frame 90 as a further example of the polygonal frame. FIG. 20 shows the state where the star-shaped frame 90 has an intermediate size. FIG. 21 shows the state where the star-shaped frame 90 has the largest size.

The star-shaped frame 90 has a shape with six projecting portions, and includes twelve extendable arms 91 forming each side of the star-shaped frame 90 and bent members 92, 92' each coupling adjoining two of extendable arms so that these two extendable arms can move together. The bent members 92 are provided at the corners projecting outward and have a bend angle of 36 degrees. The bend members 92' are provided at the corners projecting inward and have a bend angle of 108 degrees.

Figure 22:
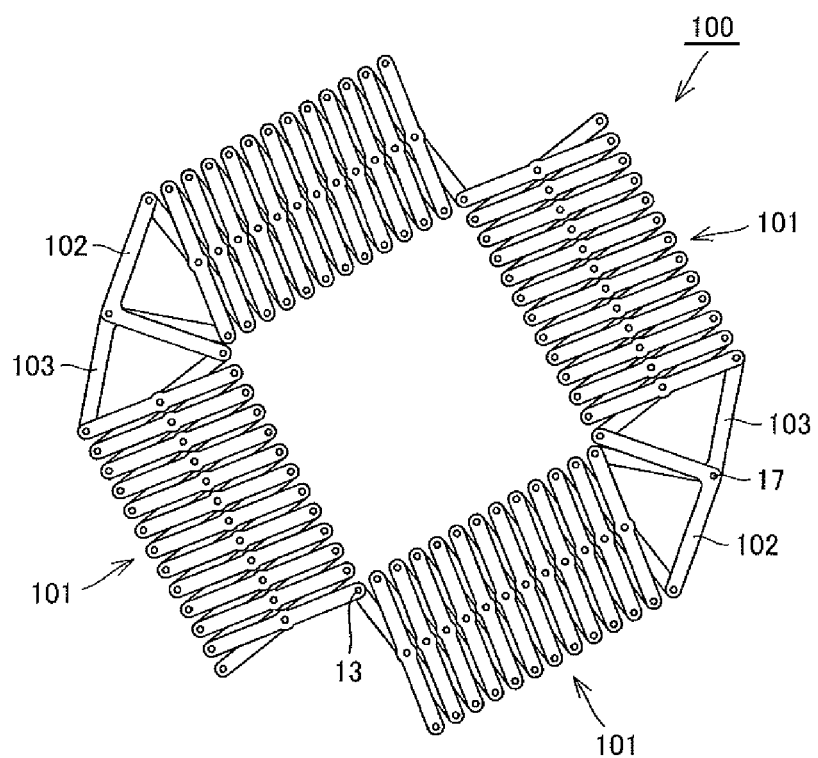
FIG. 22 is a plan view of a quadrilateral frame according to a yet further embodiment of the present invention, showing the state where the quadrilateral frame has the smallest area.
Figure 23:
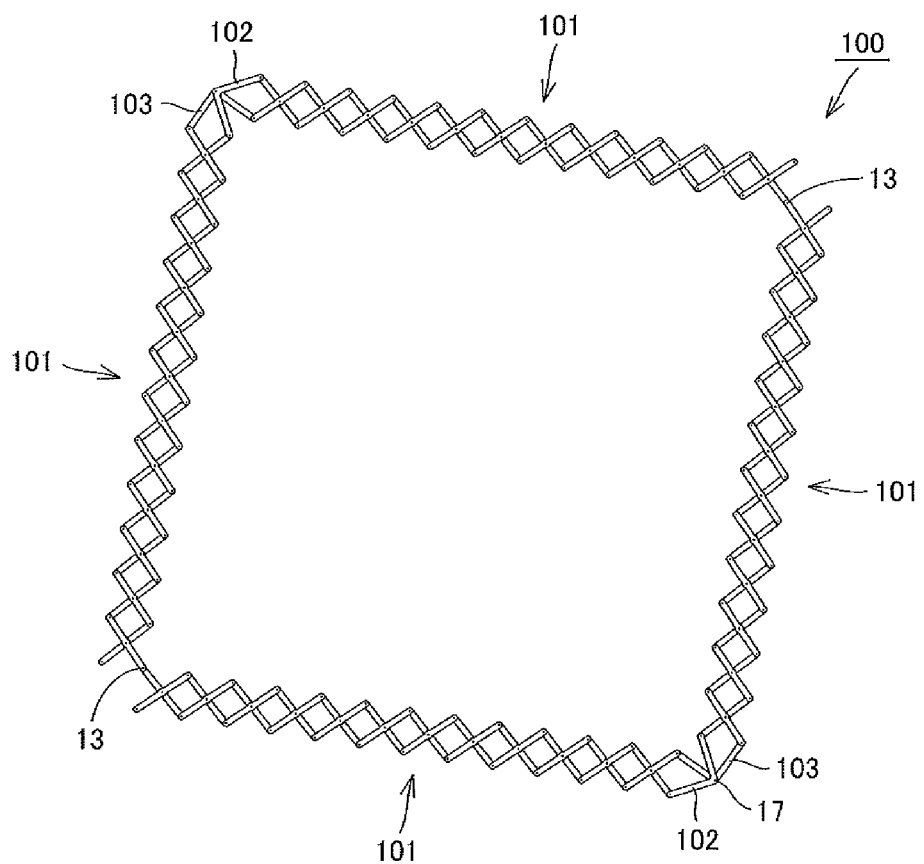
FIG. 23 is a plan view of the quadrilateral frame according to the yet further embodiment of the present invention, showing the state where the quadrilateral frame has an intermediate area.
Figure 24:
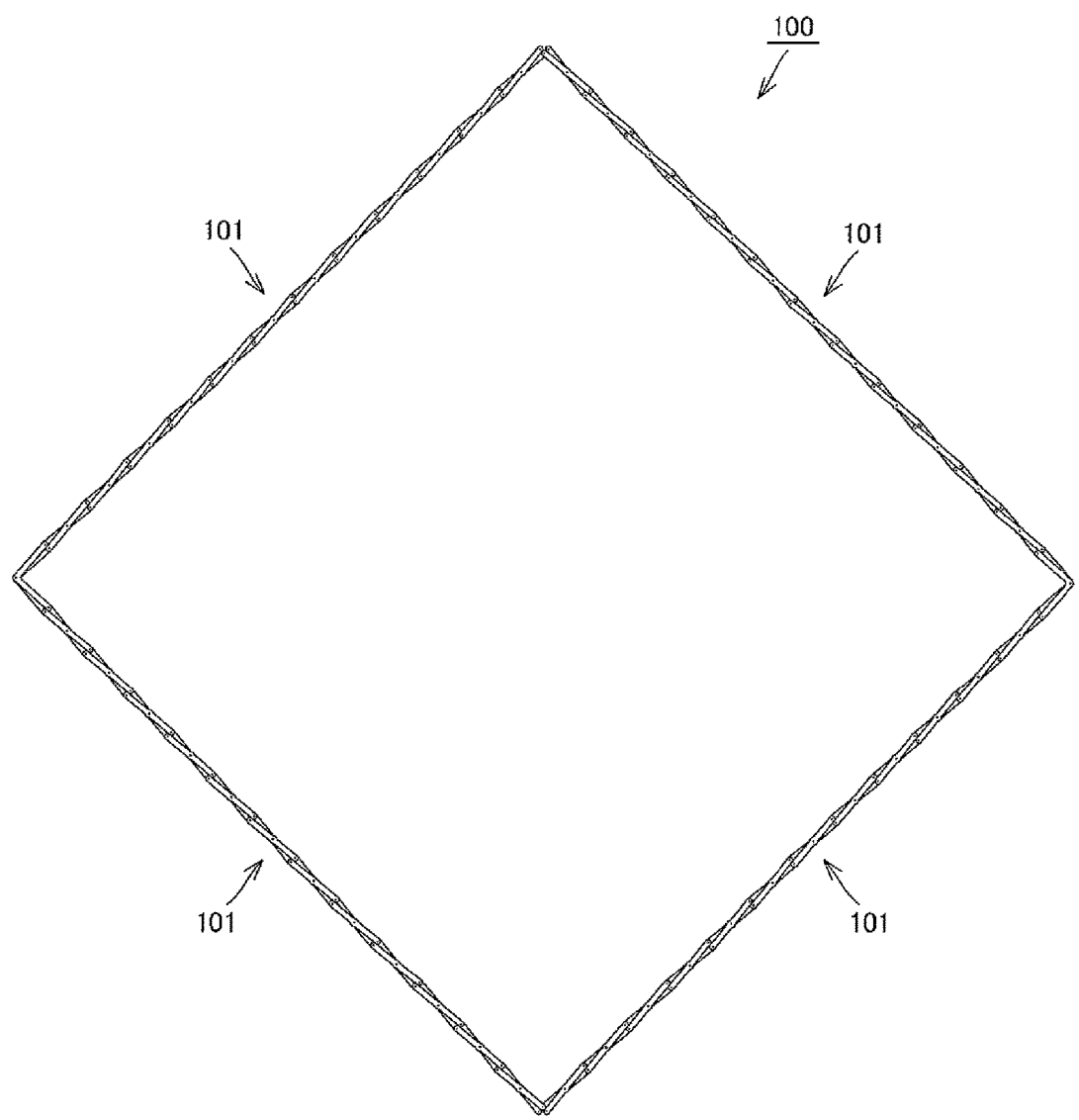
FIG. 24 is a plan view of the quadrilateral frame according to the yet further embodiment of the present invention, showing the state where the quadrilateral frame has the largest area.

FIGS. 22 to 24 show a further example of the quadrilateral frame. FIG. 22 shows the state where a quadrilateral frame 100 has the smallest area. FIG. 23 shows the state where the quadrilateral frame 100 has an intermediate area. FIG. 24 shows the state where the quadrilateral frame 100 has the largest area.

The quadrilateral frame 100 includes four extendable arms 101 forming each side of the quadrilateral frame 100, and a corner coupling unit that couples adjoining two of the extendable arms 101 at each corner of the quadrilateral frame 100. The corner coupling unit includes a first bent member 102 and a second bent member 103 at each of two diagonally opposite ones of the four corners of the quadrilateral frame 100. Since the first and second bent members 102, 103 are the same as those described in the above embodiments, description thereof will be omitted.

The corner coupling unit includes an inner end coupling member at each of the remaining two diagonally opposite corners of the quadrilateral frame 100. The inner end coupling member is the inner end coupling 13 that pivotally couples the inner end of the extendable arm 101 of one of adjoining two sides of the quadrilateral frame 100 and the inner end of the extendable arm 101 of the other side.

Figure 25:
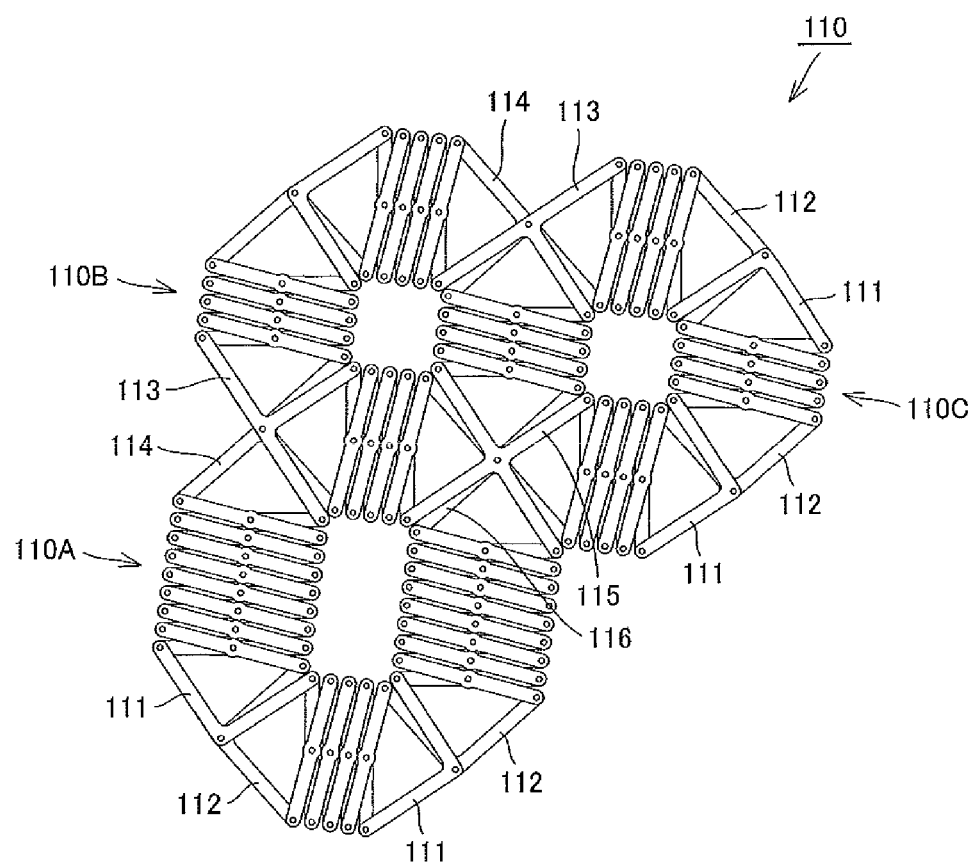
FIG. 25 is a plan view of a variable area frame formed by connecting three quadrilateral frames, showing the state where the variable area frame has the smallest area.
Figure 26:
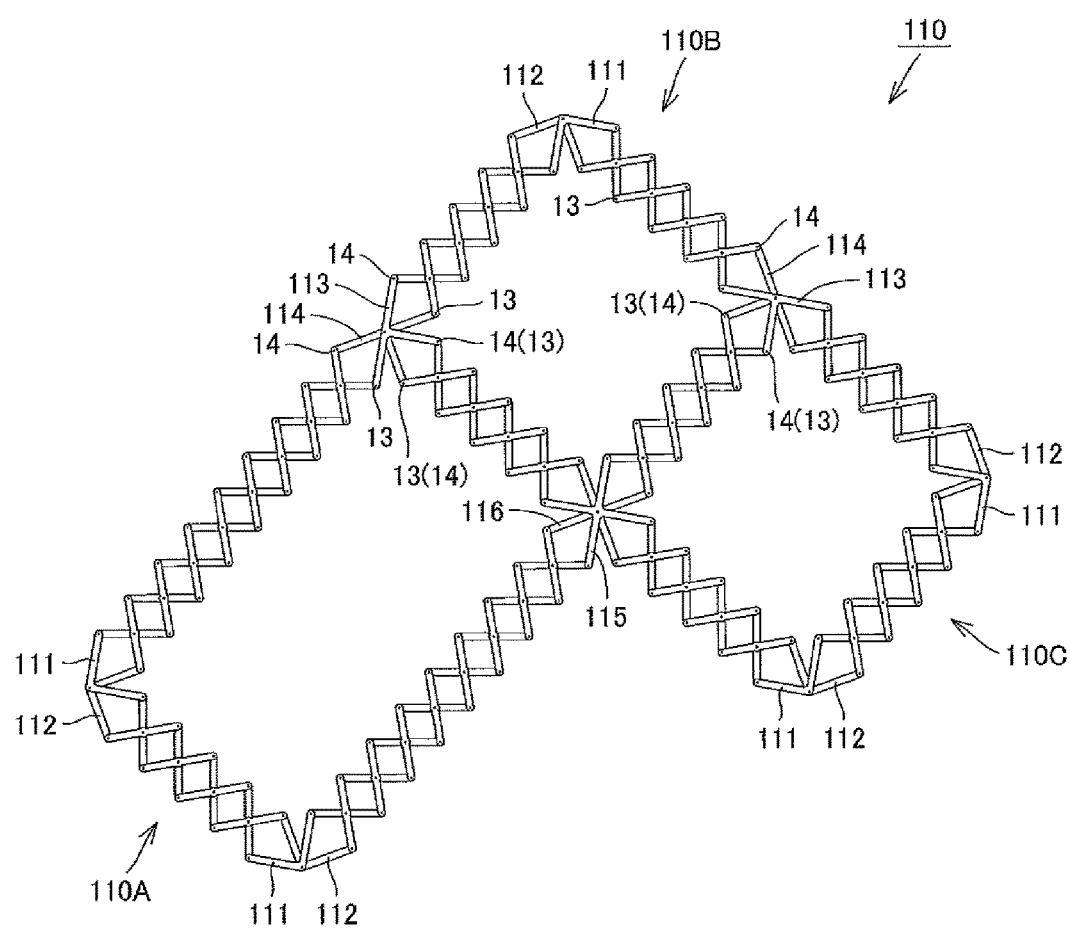
FIG. 26 is a plan view showing the state where the variable area frame shown in FIG. 25 has an intermediate area.
Figure 27:
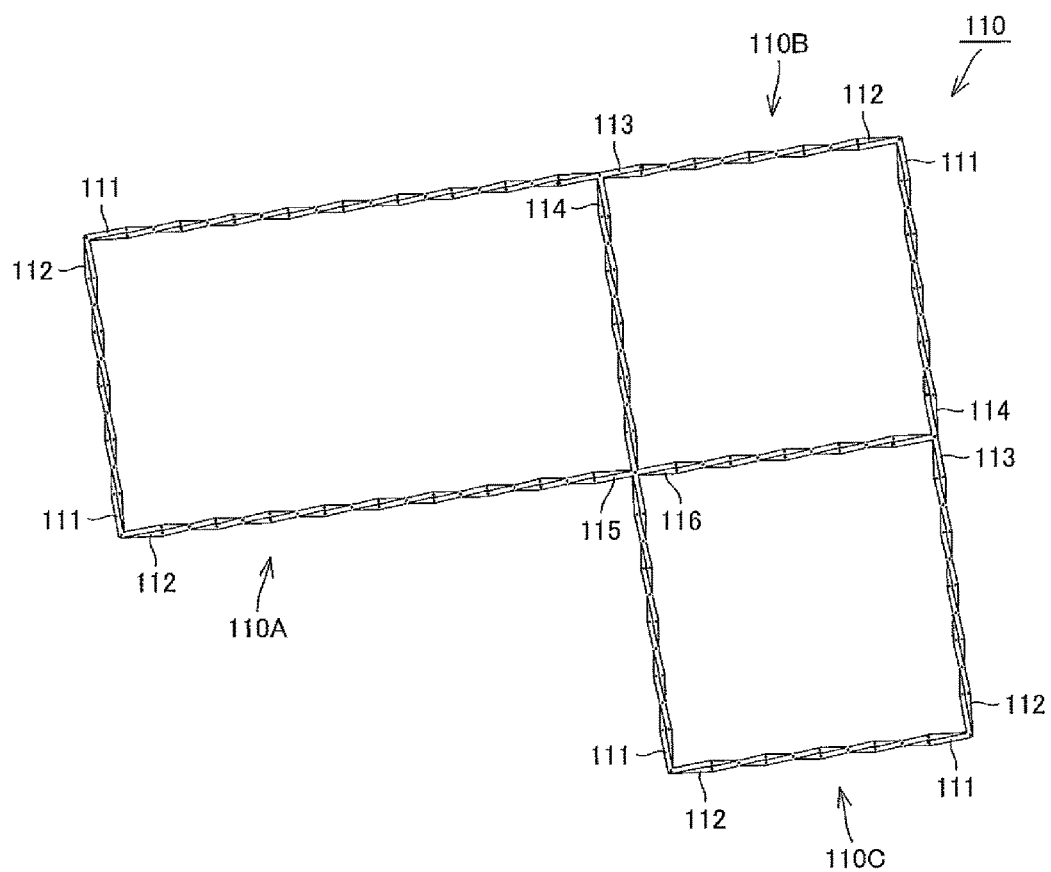
FIG. 27 is a plan view showing the state where the variable area frame shown in FIG. 25 has the largest area.

FIGS. 25 to 27 show a variable area frame connecting three quadrilateral frames. FIG. 25 shows the state where the variable area frame has the smallest area. FIG. 26 shows the state where the variable area frame has an intermediate area. FIG. 27 shows the state where the variable area frame has the largest area.

A variable area frame 110 shown in FIGS. 25 to 27 is a frame connecting a single rectangular frame 110A and two square frames 110B, 110C. The rectangular frame 110A and the square frame 110B adjoining the rectangular frame 110A has one common side. The two square frames 110B, 110C adjoining each other have one common side.

Each quadrilateral frame 110A, 110B, 110C includes a first bent member 111 and a second bent member 112 at each corner between adjoining two of the sides other than the common side. Since the manner in which the first and second bent members 111, 112 are connected and the operation of the first and second bent members 111, 112 are the same as described in the above embodiments, description thereof will be omitted.

The variable area frame 110 includes a first T-shaped bent member 113 and a second T-shaped bent member 114 at a T-shaped corner where the common side of the rectangular frame 110A and the square frame 110B meets the side of the rectangular frame 110A and the side of the square frame 110B. A lateral bar portion of the first T-shaped bent member 113 connects an inner end coupling shaft 13 of the rectangular frame 110A and an outer end coupling shaft 14 of the square frame 110B. A lateral bar portion of the second T-shaped bent member 114 connects an outer end coupling shaft 14 of the rectangular frame 110A and an inner end coupling shaft 13 of the square frame 110B.

A longitudinal bar portion of the first T-shaped bent member 113 is coupled to one of two end coupling shafts of the common side, and a longitudinal bar portion of the second T-shaped bent member 114 is coupled to the other end coupling shaft of the common side. Specifically, as viewed from the longitudinal frame 110A, the longitudinal bar portion of the first T-shaped bent member 113 is coupled to an outer end coupling shaft 14, and the longitudinal bar portion of the second T-shaped bent member 114 is coupled to an inner end coupling shaft 13. As viewed from the square frame 110B, the longitudinal bar portion of the first T-shaped bent member 113 is coupled to an inner end coupling shaft 13, and the longitudinal bar portion of the second T-shaped bent member 114 is coupled to an outer end coupling shaft 14.

Similarly, the variable area frame 110 further includes a first T-shaped bent member 113 and a second T-shaped bent member 114 at a T-shaped corner where the common side of the adjoining square frames 110B, 110C meets the side of the square frame 110B and the side of the square frame 110C.

The variable area frame 110 further includes a first cross-shaped bent member 115 and a second cross-shaped bent member 116 at a cross-shaped corner as the intersection of four sides. Each of the cross-shaped bent members 115, 116 couples end coupling shafts of each of two pairs of adjoining sides. Specifically, each of the cross-shaped bent members 115, 116 couples an outer end coupling shaft 14 of one side of each of the two pairs of adjoining sides and an inner end coupling shaft 13 of the other side of each of the two pairs of adjoining sides.

According to the variable area frame shown in FIGS. 25 to 27, the area of the three quadrilateral frames connected together can be changed.

Figure 28:
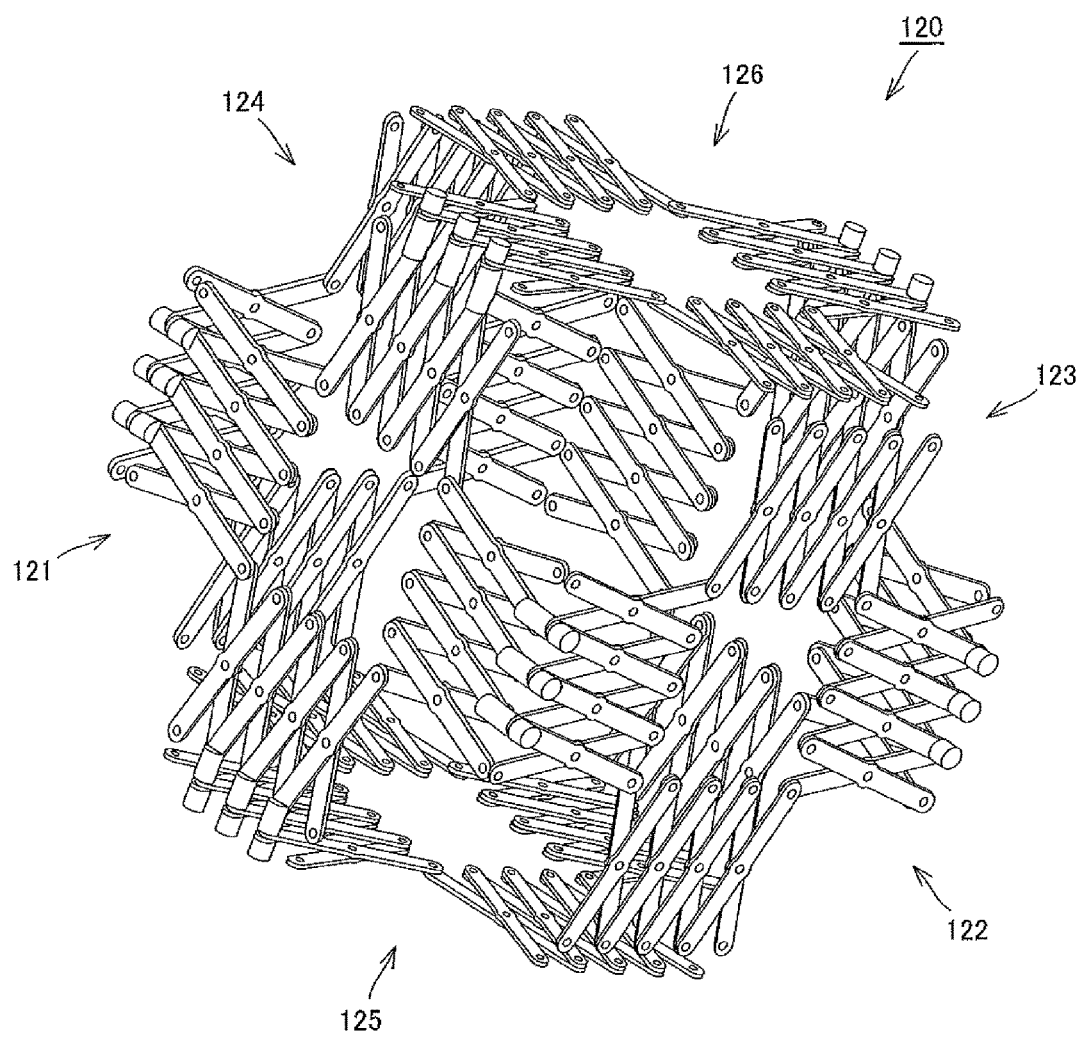
FIG. 28 is a perspective view of a variable volume three-dimensional structure according to a yet further embodiment of the present invention, showing the state where the variable volume three-dimensional structure has the smallest volume.
Figure 29:
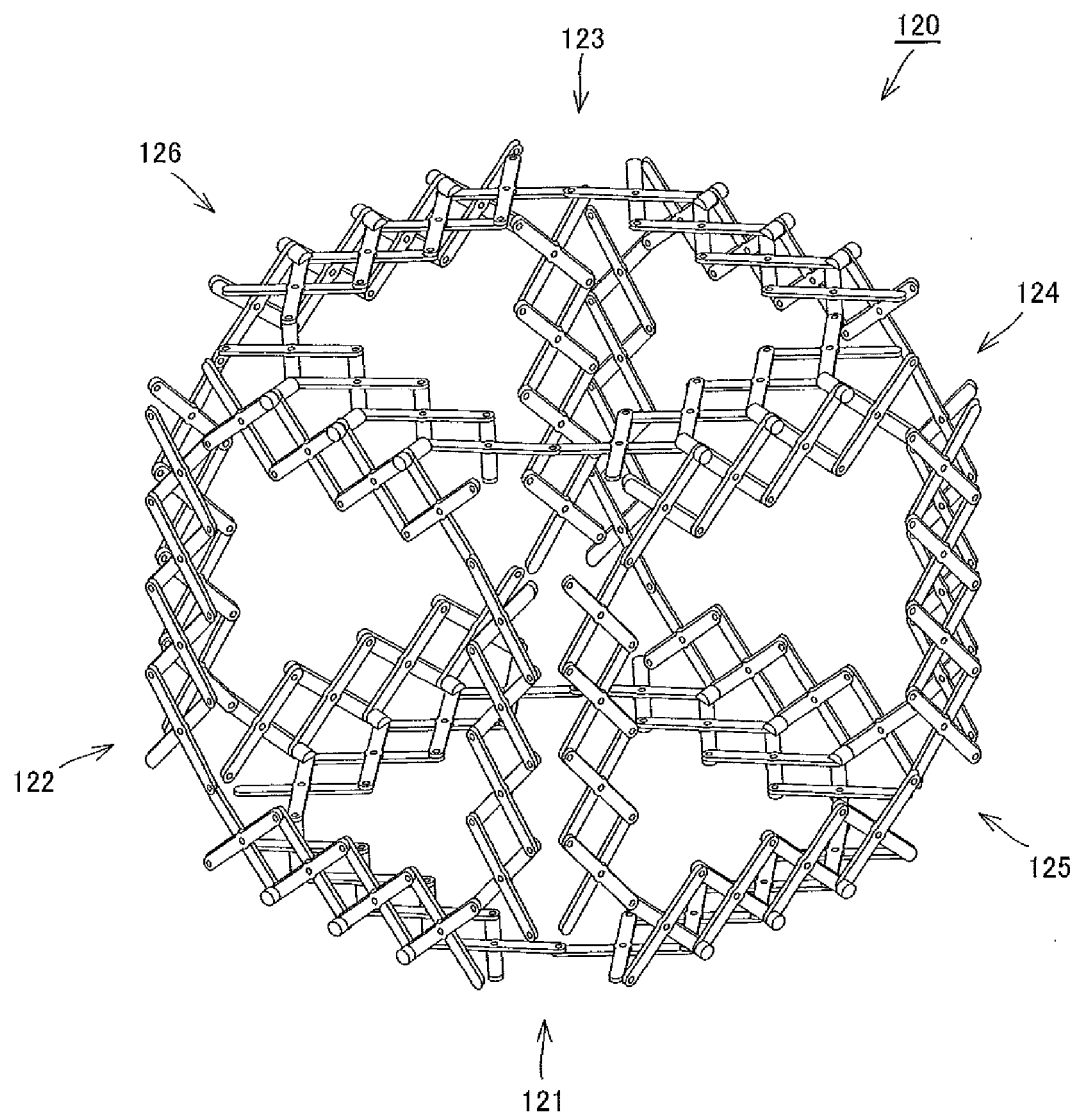
FIG. 29 is a perspective view showing the state where the variable volume three-dimensional structure shown in FIG. 28 has an intermediate volume.
Figure 30:
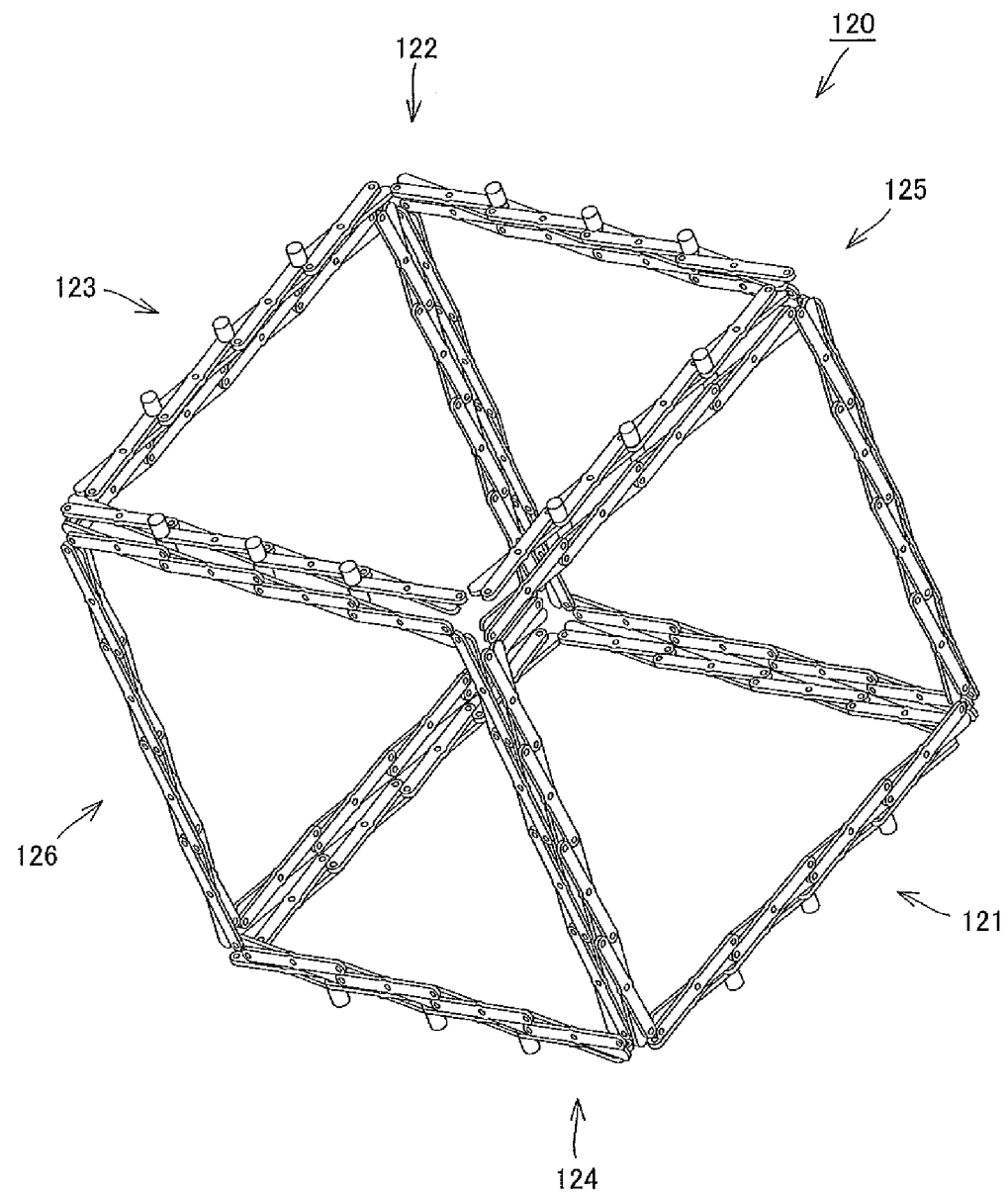
FIG. 30 is a perspective view showing the state where the variable volume three-dimensional structure shown in FIG. 28 has the largest volume.

FIGS. 28 to 30 shows a variable volume three-dimensional structure having a three-dimensional shape. FIG. 28 shows the state where the variable volume three-dimensional structure has the smallest volume. FIG. 29 shows the state where the variable volume three-dimensional structure has an intermediate volume. FIG. 30 shows the state where the variable volume three-dimensional structure has the largest volume.

A variable volume three-dimensional structure 120 shown in FIGS. 28 to 30 has a cubic shape defined by six faces, and includes a first face frame 121, a second face frame 122, a third face frame 123, a fourth face frame 124, a fifth face frame 125, and a sixth face frame 126. The first to fourth face frames 121 to 126 have a quadrilateral shape. Each side of each face frame 121 to 126 is formed by an extendable arm formed by connecting a plurality of cross units. In adjoining two of the face frames 121 to 126, outer end coupling shafts of two extendable arms adjoining each other along each side of the cubic shape are connected together. The adjoining two face frames 121 to 126 thus move together so that their area is changed.

Figure 31A:
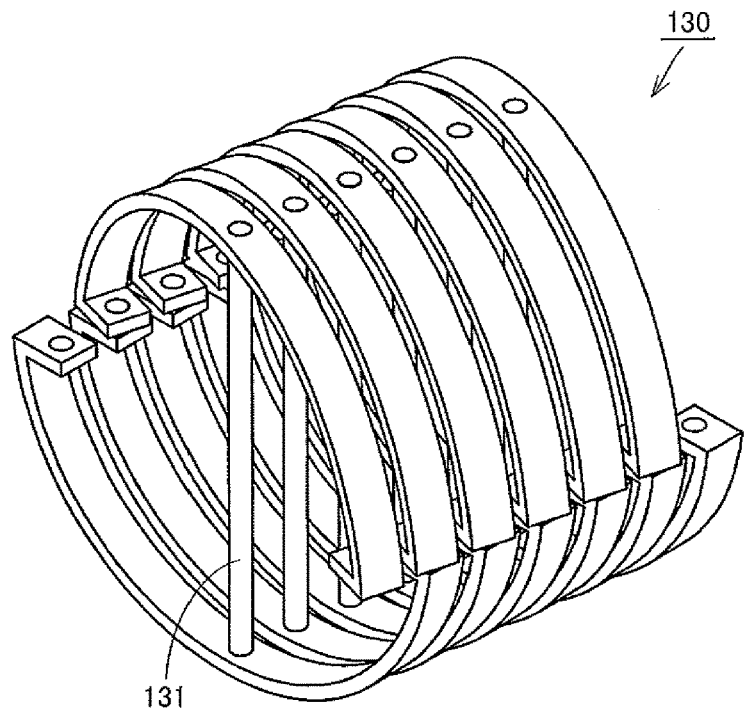
FIG. 31A is a perspective view of an extendable arm in other form and FIG. 31B is a plan view thereof, both showing the state where the extendable arm has the smallest length.
Figure 31B:
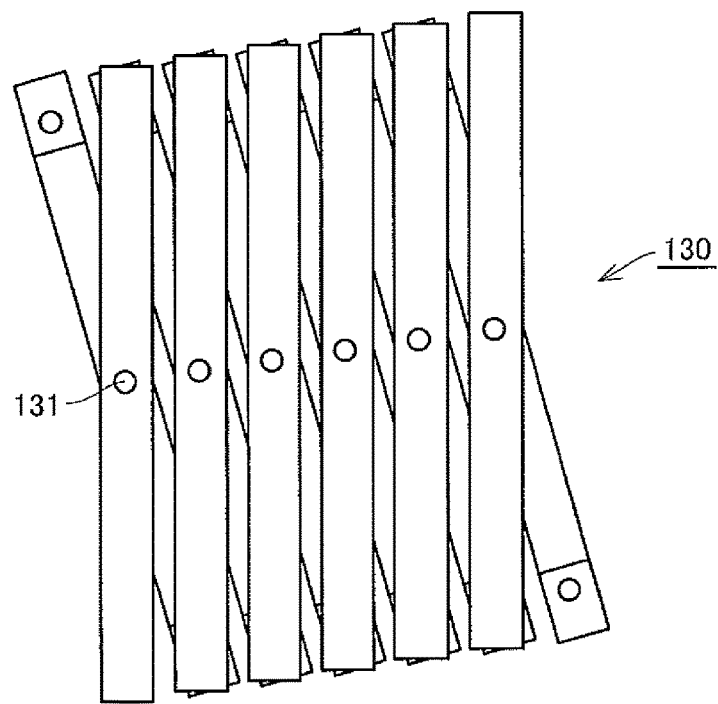
Figure 32A:
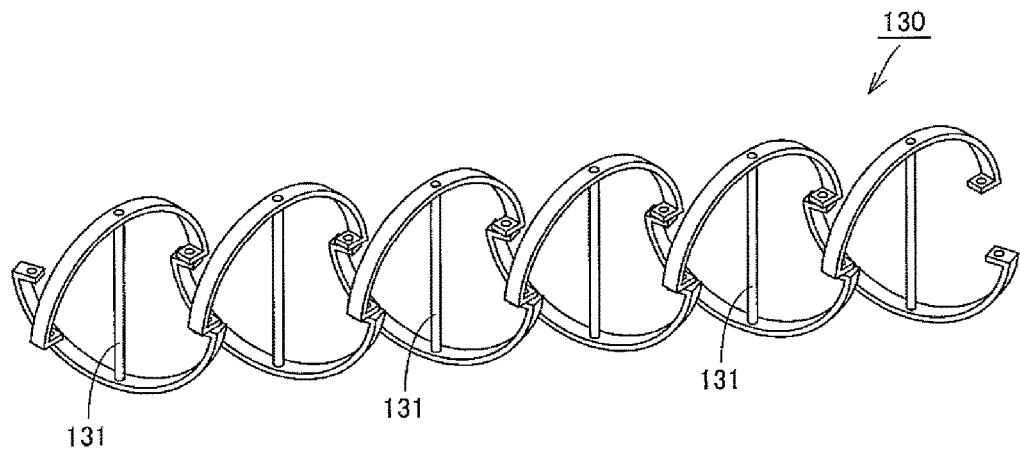
FIG. 32A is a perspective view of the extendable arm shown in FIGS. 31A and 31B and FIG. 32B is a plan view thereof, both showing the state where the extendable arm has an intermediate length.
Figure 32B:
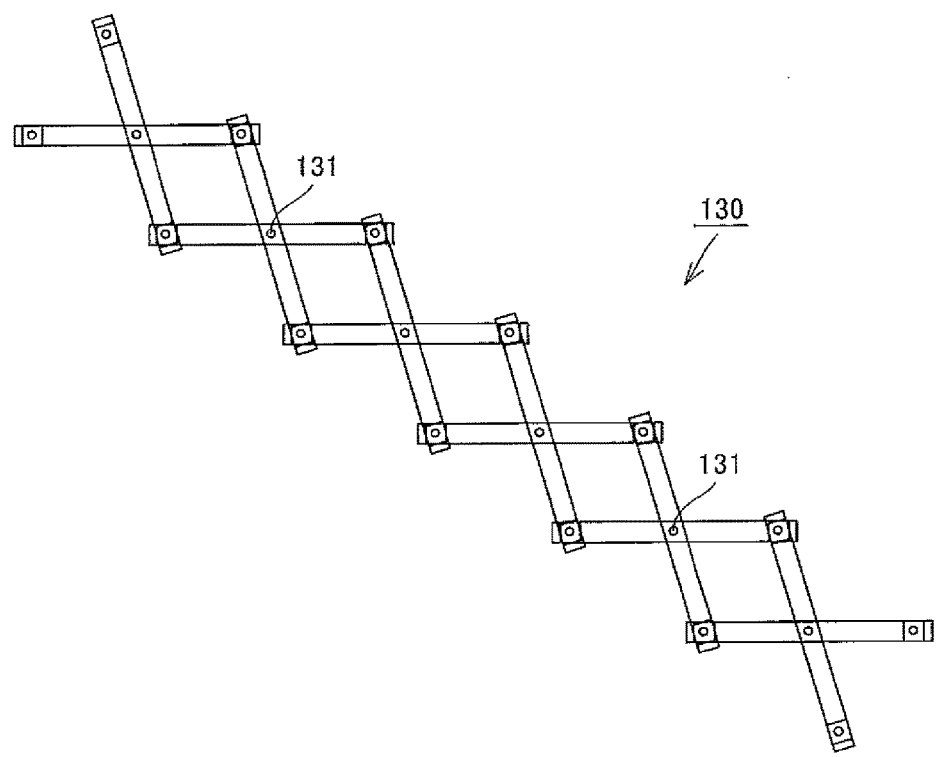
Figure 33A:
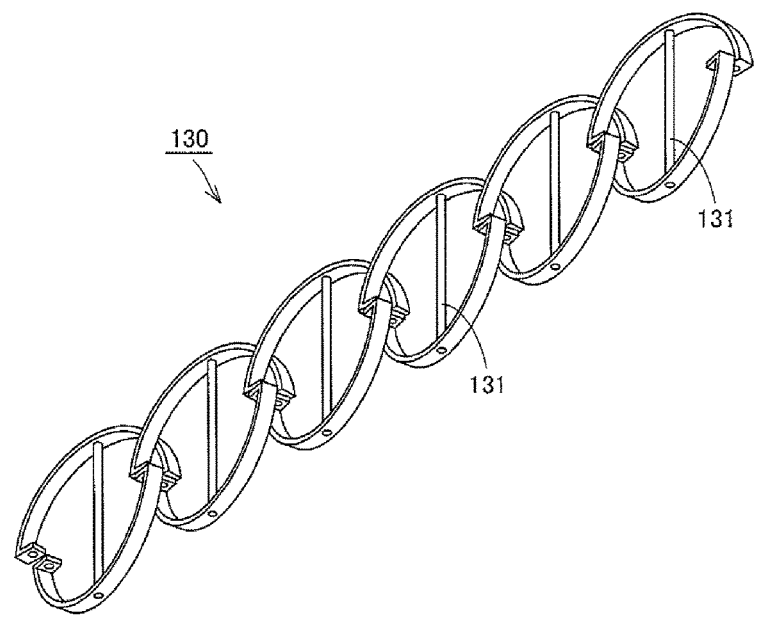
FIG. 33A is a perspective view of the extendable arm shown in FIGS. 31A and 31B and FIG. 33B is a plan view thereof, both showing the state where the extendable arm has the largest length.
Figure 33B:
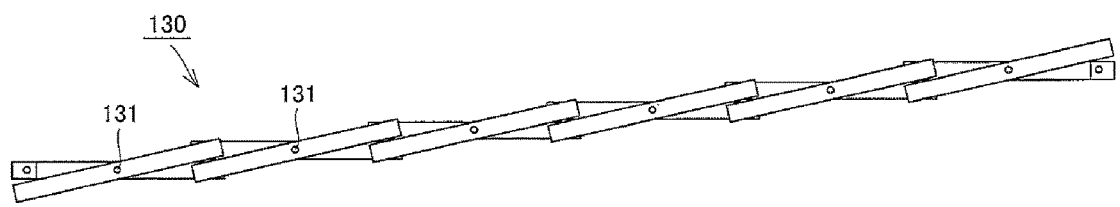

FIGS. 31A to 33B show an extendable arm in other form. FIGS. 31A and 31B show the state where the extendable arm has the smallest length. FIGS. 32A and 32B show the state where the extendable arm has an intermediate length. FIGS. 33A and 33B show the state where the extendable arm has the largest length.

As shown in the figures, an extendable arm 130 is formed by connecting a plurality of cross units. In this extendable arm 130, a pair of rigid members forming each cross unit have an arc shape, but are curved in opposite directions. The extendable arm 130 therefore has a substantially circular shape in transverse section perpendicular to the direction in which the extendable arm 130 extends and contracts. In the illustrated embodiment, each pair of rigid members are pivotally coupled by a middle coupling shaft 131 extending linearly.

Figure 34:
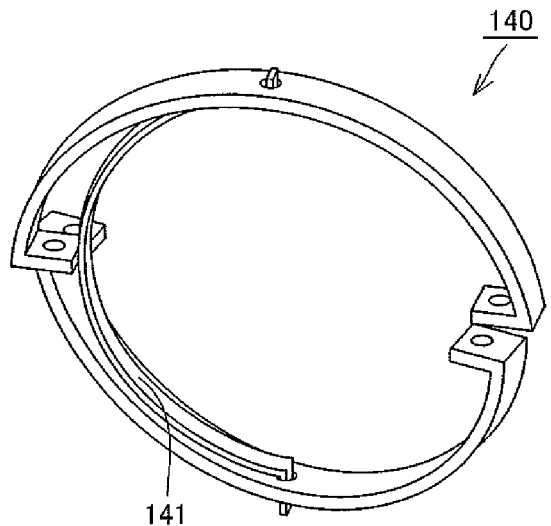
FIG. 34 is a perspective view showing an extendable arm in other form.

FIG. 34 shows a modification of the embodiment shown in FIGS. 31A to 33B. In an extendable arm 140 shown in FIG. 34, a middle coupling shaft 141 has a shape greatly curved laterally. In this embodiment, a larger internal space is available in the extendable arm 140, whereby, for example, a fire hose etc. can be placed in the extendable arm 140.

Figure 35:
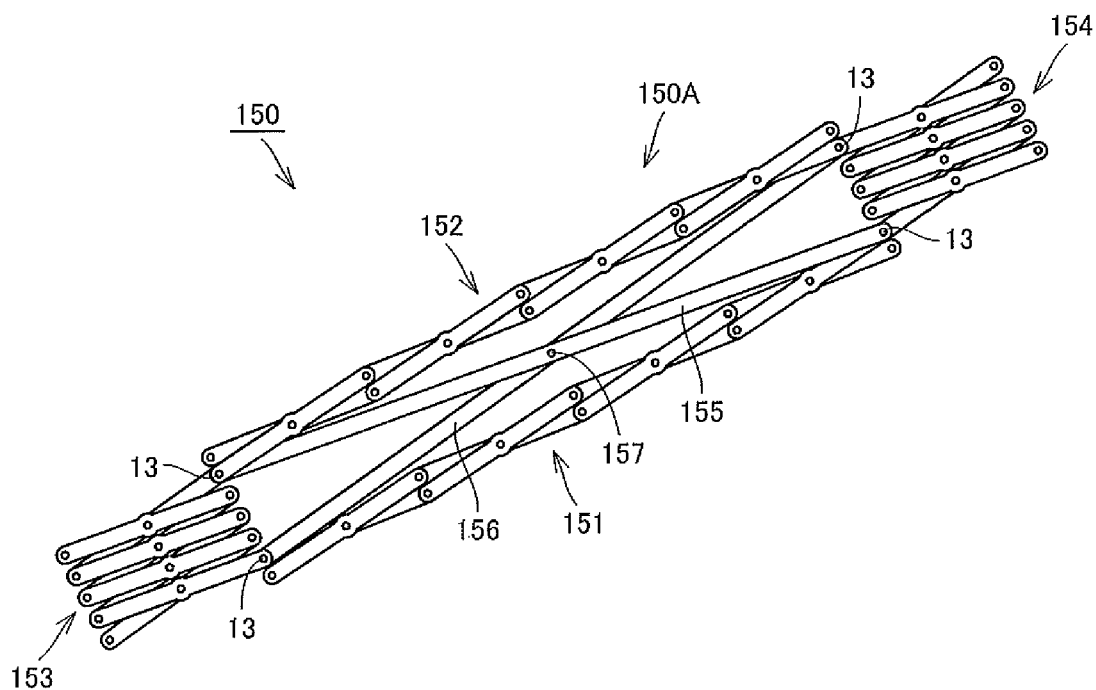
FIG. 35 is a plan view of a variable volume three-dimensional structure according to a yet further embodiment of the present invention.
Figure 36:
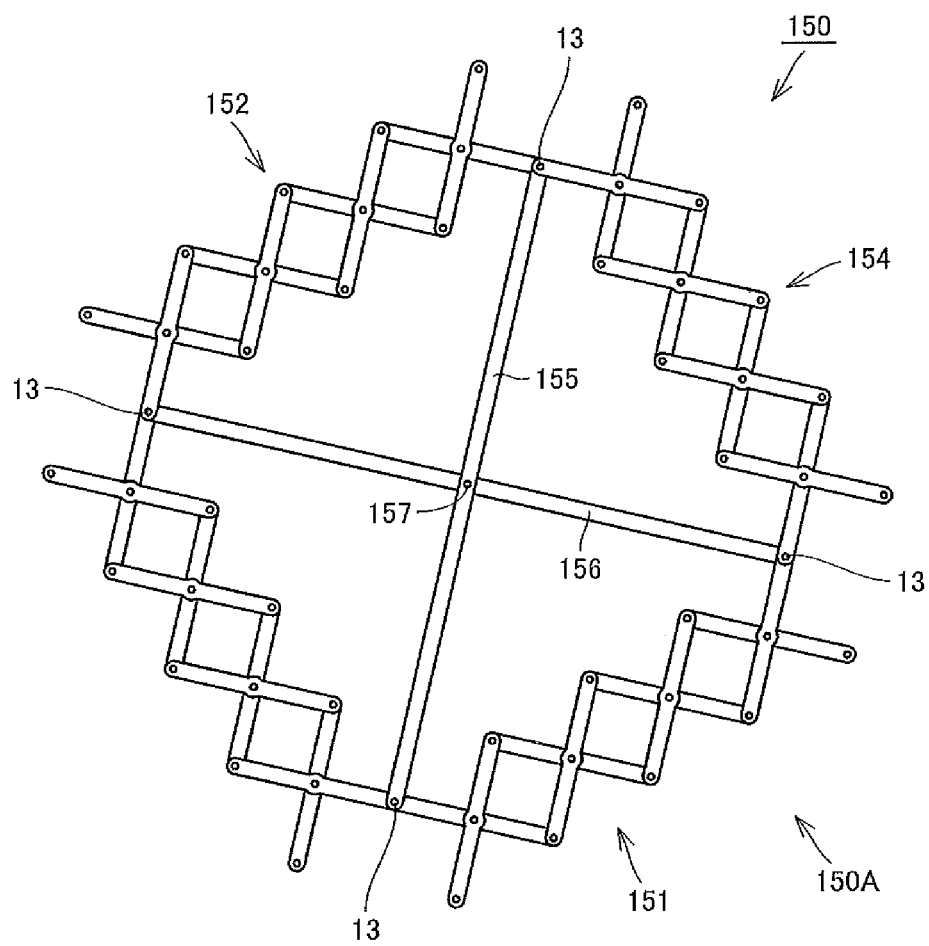
FIG. 36 is a plan view showing the state where the variable volume three-dimensional structure of the embodiment shown in FIG. 35 has been operated so that its shape is changed.
Figure 37:
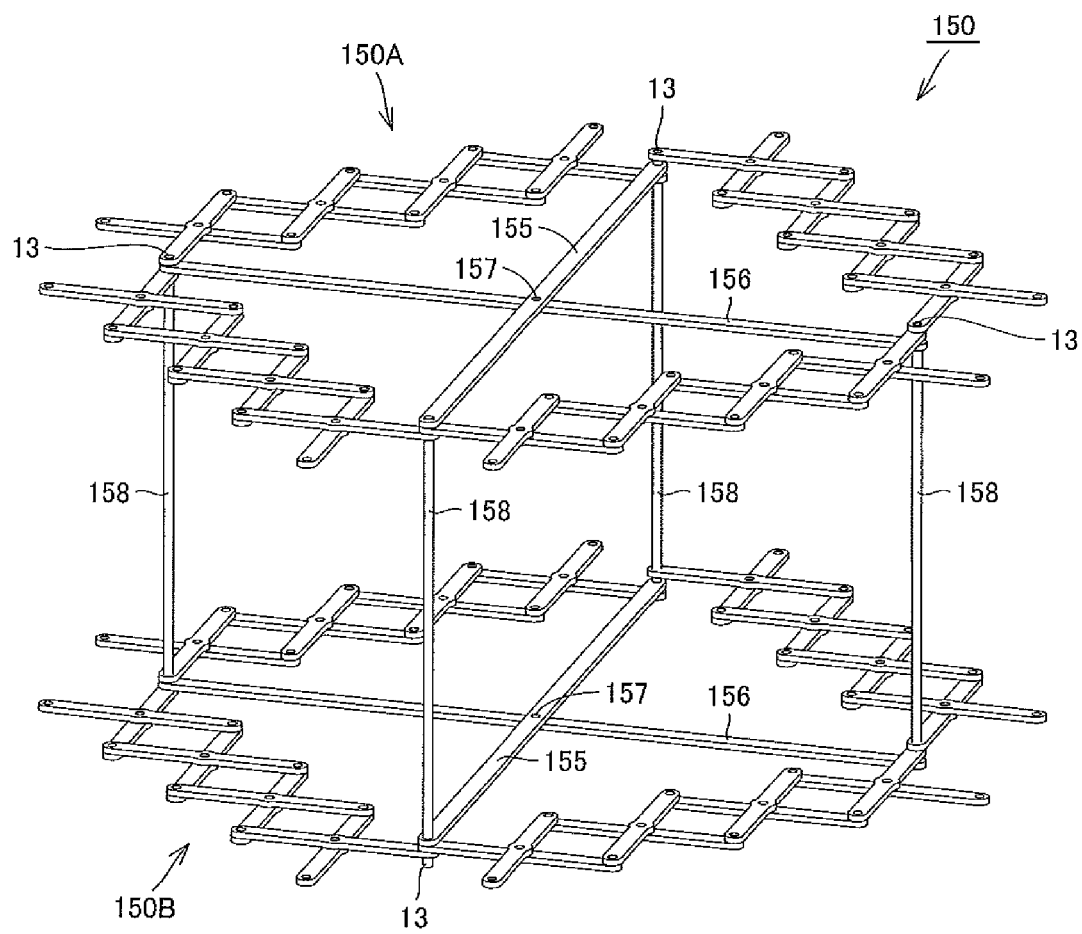
FIG. 37 is a plan view showing the state where the variable volume three-dimensional structure of the embodiment shown in FIG. 35 has been operated so that its shape is changed.

FIGS. 35 to 37 show a further embodiment of the variable volume three-dimensional structure. FIG. 35 is a plan view showing the variable volume three-dimensional structure in an initial state. FIG. 36 is a plan view showing the variable volume three-dimensional structure that is being operated. FIG. 37 is a perspective view showing the variable volume three-dimensional structure that is being operated.

A variable volume three-dimensional structure 150 shown in FIGS. 35 to 37 includes two quadrilateral frames 150A, 150B separated from each other in the vertical direction, and longitudinal bars 158 as longitudinal coupling members coupling the quadrilateral frames 150A, 150B. As shown in FIG. 35, in the initial state of the variable volume three-dimensional structure 150, the quadrilateral shape of the quadrilateral frame 150A is formed by two extended extendable arms 151, 152 and two contracted extendable arms 153, 154. A first coupling member 155 and a second coupling member 156 cross each other to form an X-shape and are pivotally coupled together by a middle coupling shaft 157. The first and second coupling members 155, 156 couple adjoining two of the extendable arms 151 to 154 at each corner of the quadrilateral frame 150A so that these two extendable arms can move together.

Specifically, one end of the first coupling member 155 is coupled to a common inner end coupling shaft 13 of the second and third extendable arms 152, 153, and the other end of the first coupling member 155 is coupled to a common inner end coupling shaft 13 of the first and fourth extendable arms 151, 154. One end of the second coupling member 156 is coupled to a common inner end coupling shaft 13 of the first and third extendable arms 151, 153, and the other end of the second coupling member 156 is coupled to a common inner end coupling shaft 13 of the second and fourth extendable arms 152, 154.

In the state shown in FIGS. 36 and 37, the extendable arms 151, 152, 153, 154 have substantially the same length. As shown in FIG. 37, each longitudinal bar 158 coupling the upper and lower quadrilateral frames 150A, 150B couples the upper and lower common inner coupling shafts 13.

Although some embodiments of the present invention are described above with reference to the drawings, the present invention is not limited to the illustrated embodiments. Various modifications or variations can be made to the illustrated embodiments without departing from the spirit and scope of the present invention.

The variable volume three-dimensional structure having the upper and lower variable area frames can be advantageously used in many applications such as architectural structures, containers, articles on display, pavilions, play equipment, assembling toys, decorations, art objects, furniture, beds of vehicles, lighting devices, enclosures for animals such as pets, steps, robot bodies, fish tanks, pools, bathroom stalls, dressing stalls, shower stalls, above-ground buildings, underground buildings, underwater buildings, aerial buildings, simple apartments (e.g., for stricken areas), warehouses, devices for holding a shower hose, a kitchen hose, or a fire hose, vegetable factories, tents, and zoo and botanical gardens.

More specific examples of the above applications will be shown below.

(1) Building Structures

The present invention is applicable to architectural structures with walls, floors, and ceilings which are constructed by combining polygonal variable area frames and/or variable volume three-dimensional structures with plate-like and/or sheet-like products. Examples of the plate-like products include wooden boards, metal boards, acrylic sheets, glass sheets, and composite material boards. Examples of the sheet-like products include leather sheets, sheets, and films.

Examples of the architectural structures include simple houses, children's rooms, study rooms, storerooms, warehouses, dressing rooms, shower stalls, bathroom stalls, enclosures for pets, greenhouses, event venues, platform stages, assembly halls, work areas, studios, powder rooms, exhibition halls, zoo and botanical gardens, flower shops, and observation decks.

(2) Arms or Poles for Holding a Shower Hose, a Fire Hose or Rope, etc.

For example, the present invention is also applicable to hose holding frames having a variable length and using extendable arms having a circular shape in transverse section, poles for national flags, banners, and carp streamers, etc.

(3) Areal, Underwater, and Underground Structures

For example, the present invention is also applicable to large structures using extendable arms, variable area frames, and/or variable volume three-dimensional structures, such as large aerial antennas, large solar panels, large solar collectors, and housing facilities provided in space or in seawater.

(4) Applications for Gardening

For example, the present invention is also applicable to holding frames that can be adjusted to an optimal size as a trailing rose, a morning glory, a vine, etc. grows.

(5) Vegetable Factories

For example, the present invention is also applicable to medium-sized vegetable factories that are run by a group of people living in the same area (community), flower factories, and vegetable factories for facilitating communication or health maintenance of the elderly.

(6) Assembling Toys

For example, the present invention is also applicable to cross-link type toys that are required for growth and activation of the brain. Any assembling toys that involve assembling of a plurality of kinds of extendable arms, variable area frames, and/or variable volume three-dimensional structures in upper-lower, right-left, front-back, and/or inside-outside positional relations as desired with fingers can help growth and activation of children's or elderly's brains.

(7) Large, Medium, and Small-Size Art Objects

For example, art objects with various shapes can be created by combining a plurality of kinds of variable area frames and/or variable volume three-dimensional structures. Such art objects may be placed in the parks or on the streets, or may be placed indoors such as in the buildings in event venues, etc., or may be placed indoors such as in the houses, hotels, hospitals, children's facilities, or elderly facilities. Visually attractive decorations can be created by combining color and light.

(8) Indoor Vegetable Greenhouses

For example, the present invention is also applicable to decorative vegetable greenhouses, flower stands, or planters that also be used as green interior decoration, by combination of the present invention with light emitting diodes (LEDs).

(9) Tents

The present invention is also applicable to tents with various shapes and sizes by combination of the present invention with leather sheets, fabric sheets, etc.

(10) Temporary Houses or Stores, and Temporary Disaster Housing

For example, simple houses etc. can be built by connecting a plurality of cubic or cuboid objects formed by combining quadrilateral frames with boards.

(11) Wooden or Metal Furniture

For example, the present invention is also applicable to beds, sofas, tables, storage racks or containers, hangers, shelves, stands, etc. whose area, volume, shape, color, etc. can be easily changed.

The invention claimed is:

1. A variable area frame as a polygonal frame whose area can be changed, comprising:
   extendable arms forming each side of said polygonal frame; and
   a coupling mechanism that couples adjoining two of said extendable arms so that said adjoining two extendable arms can move together, in order to allow adjoining two sides of said polygonal frame to extend and contract together,
   wherein
   each of said extendable arms includes:
      a plurality of cross units each formed by pivotally coupling two rigid members, which cross each other to form an X-shape, via a middle coupling shaft; and
      an end coupling portion that pivotally couples ends of adjoining ones of said cross units, said end coupling portion including inner end coupling shafts located on an inner side of said polygonal frame and outer end coupling shafts located on an outer side of said polygonal frame,
   said coupling mechanism includes, at a corner of said polygonal frame:
      a first bent member that pivotally couples said inner end coupling shaft of said extendable arm of one of said adjoining two sides of said polygonal frame and said outer end coupling shaft of said extendable arm of the other side;
      a second bent member that pivotally couples said outer end coupling shaft of said extendable arm of said one of said adjoining two sides of said polygonal frame and said inner end coupling shaft of said extendable arm of the other side; and
      a corner coupling shaft that pivotally couples said first and second bent members at their intersection, and
   the inner end coupling shaft of the extendable arm coupling a first rigid member with the first bent member is linearly aligned in a plan view with the middle coupling shaft extending through the first rigid member and with the outer end coupling shaft coupling the first rigid member with a second rigid member.

2. The variable area frame according to claim 1, wherein said first and second bent members have a bend angle of A/n, where A represents a sum of interior angles of an n-gon.

3. The variable area frame according to claim 1, wherein said coupling mechanism includes at a corner of said polygonal frame an inner end coupling member that pivotally couples an inner end of said extendable arm of one of said adjoining two sides of said polygonal frame and an inner end of said extendable arm of the other side.

4. The variable area frame according to claim 3, wherein said coupling mechanism includes at said corner of said polygonal frame an outer end coupling member that pivotally couples an outer end of said extendable arm of one of said adjoining two sides of said polygonal frame and an outer end of said extendable arm of the other side.

5. The variable area frame according to claim 1, wherein said polygonal frame is a quadrilateral frame, and
a value of L2/L1 is in a range of 1 to 1.5, where L1 represents an interval between said middle coupling shaft and said inner end coupling shaft and an interval between said middle coupling shaft and said outer end coupling shaft in each of said rigid members, and L2 represents an interval between said corner coupling shaft and said inner end coupling shaft and an interval between said corner coupling shaft and said outer end coupling shaft in each of said bent members.

6. The variable area frame according to claim 1, wherein said polygonal frame is a quadrilateral frame,
said coupling mechanism includes said first bent member, said second bent member, and said corner coupling shaft at each of two diagonally opposite ones of four corners of said quadrilateral frame, and
said coupling member includes at each of the remaining two diagonally opposite corners of said quadrilateral frame an inner end coupling member that pivotally couples an inner end of said extendable arm of one of said adjoining two sides of said quadrilateral frame and an inner end of said extendable arm of the other side.

7. A variable volume three-dimensional structure, comprising:
a longitudinal coupling member that couples two of said variable area frames according to claim 1 such that said two variable area frames are separated from and parallel to each other.

8. The variable volume three-dimensional structure according to claim 7, wherein said longitudinal coupling member is a bar having a fixed longitudinal length.

9. The variable volume three-dimensional structure according to claim 7, wherein said longitudinal coupling member has a variable longitudinal length.

10. The variable volume three-dimensional structure according to claim 9, wherein
said longitudinal coupling member is a longitudinal extendable arm including a cross unit formed by two rigid members that cross each other to form an X-shape.

11. The variable volume three-dimensional structure according to claim 10, wherein
an upper end of said longitudinal extendable arm is coupled to said end coupling portion of said extendable arm of one of said two variable area frames, or an upper one of said two variable area frames, and
a lower end of said longitudinal extendable arm is coupled to said end coupling portion of said extendable arm of the other variable area frame, or a lower one of said two variable area frames.

12. The variable volume three-dimensional structure according to claim 11, wherein
said upper end of said longitudinal extendable arm is coupled to said inner end coupling shaft and said outer end coupling shaft of said extendable arm of one of said two variable area frames, or said upper one of said two variable area frames, and
said lower end of said longitudinal extendable arm is coupled to said inner end coupling shaft and said outer end coupling shaft of said extendable arm of the other variable area frame, or said lower one of said two variable area frames.

13. The variable volume three-dimensional structure according to claim 10, wherein
an upper end of said longitudinal extendable arm is coupled to two of said inner end coupling shafts, two of said outer end coupling shafts, or two of said middle coupling shafts of said extendable arm of one of said two variable area frames, or an upper one of said two variable area frames, and
a lower end of said longitudinal extendable arm is coupled to two of said inner end coupling shafts, two of said outer end coupling shafts, or two of said middle coupling shafts of said extendable arm of the other variable area frame, or a lower one of said two variable area frames.

14. An assembling toy, comprising:
a plurality of said variable area frames; and/or
a plurality of said variable volume three-dimensional structures according to claim 7.

* * * * *